US012334779B2

(12) United States Patent
Sasaki et al.

(10) Patent No.: US 12,334,779 B2
(45) Date of Patent: Jun. 17, 2025

(54) ROTOR, ELECTRIC MOTOR, AND ROTOR PRODUCTION METHOD

(71) Applicant: IHI Corporation, Tokyo (JP)

(72) Inventors: Yuji Sasaki, Tokyo (JP); Naoki Oiwa, Tokyo (JP); Natsuki Yoneyama, Tokyo (JP); Yohei Sakakibara, Tokyo (JP)

(*) Notice: Subject to any disclaimer, the term of this patent is extended or adjusted under 35 U.S.C. 154(b) by 145 days.

(21) Appl. No.: 18/069,231

(22) Filed: Dec. 21, 2022

(65) Prior Publication Data
US 2023/0118484 A1    Apr. 20, 2023

Related U.S. Application Data

(63) Continuation of application No. PCT/JP2021/026862, filed on Jul. 16, 2021.

(30) Foreign Application Priority Data

Aug. 5, 2020    (JP) .................. 2020-133110

(51) Int. Cl.
H02K 1/27        (2022.01)
H02K 1/278       (2022.01)
(Continued)

(52) U.S. Cl.
CPC ............. H02K 1/28 (2013.01); H02K 1/278 (2013.01); H02K 15/03 (2013.01); H02K 15/12 (2013.01); H02K 21/14 (2013.01)

(58) Field of Classification Search
CPC ......... H02K 1/28; H02K 1/278; H02K 15/03; H02K 15/12; H02K 21/14; H02K 1/2733
See application file for complete search history.

(56) References Cited

U.S. PATENT DOCUMENTS

2002/0125780 A1    9/2002  Shiratori
2012/0228976 A1*   9/2012  Petro .................... H02K 1/2791
                                                    310/156.07
(Continued)

FOREIGN PATENT DOCUMENTS

CN    204732990     10/2015
CN    109314421      2/2019
(Continued)

OTHER PUBLICATIONS

International Preliminary Report on Patentability with Written Opinion dated Feb. 16, 2023 for PCT/JP2021/026862.
(Continued)

*Primary Examiner* — Thomas Truong
(74) *Attorney, Agent, or Firm* — SOEI PATENT & LAW FIRM

(57) ABSTRACT

A rotor includes a cylindrical magnet structure extending in an axial direction to cover a shaft, and a protective tube including a fiber body covering an outer circumferential surface of the magnet structure. The outer circumferential surface of the magnet structure has a first tapered surface gradually decreasing in diameter toward a first end surface of the magnet structure, and a second tapered surface gradually decreasing in diameter toward a second end surface opposite the first end surface in the axial direction. The protective tube includes a first end portion that is bonded to the first tapered surface of the magnet structure, and a second end portion that is bonded to the second tapered surface of the magnet structure.

20 Claims, 9 Drawing Sheets

(51) Int. Cl.
*H02K 1/28* (2006.01)
*H02K 15/03* (2006.01)
*H02K 15/12* (2006.01)
*H02K 21/14* (2006.01)

(56) References Cited

U.S. PATENT DOCUMENTS

| | | | |
|---|---|---|---|
| 2017/0310175 A1 | 10/2017 | Arimatsu et al. | |
| 2018/0114622 A1* | 4/2018 | Fujihara | H01F 7/0247 |
| 2019/0036401 A1* | 1/2019 | Takano | H02K 15/03 |
| 2019/0207448 A1 | 7/2019 | Ozasa | |

FOREIGN PATENT DOCUMENTS

| | | | |
|---|---|---|---|
| CN | 109728682 | 5/2019 | |
| DE | 102018005142 | 1/2019 | |
| JP | S63-194562 | 8/1988 | |
| JP | H6-029357 | 4/1994 | |
| JP | H7-046780 | 2/1995 | |
| JP | H9-224339 | 8/1997 | |
| JP | 2001-086677 | 3/2001 | |
| JP | 2002-078258 | 3/2002 | |
| JP | 2002-272034 | 9/2002 | |
| JP | 2003-259578 | 9/2003 | |
| JP | 2017-195751 | 10/2017 | |
| JP | 2019-030061 | 2/2019 | |
| JP | 2018-216257 | 11/2019 | |
| WO | 2018/012153 | 1/2018 | |
| WO | 2018/216257 | 11/2018 | |
| WO | WO-2018216257 A1 * | 11/2018 | H02K 1/27 |
| WO | 2019/150500 | 8/2019 | |

OTHER PUBLICATIONS

International Search Report dated Sep. 21, 2021 for PCT/JP2021/026862.

Yang Jingxue et al., "A Kind of Rotor Construction to Prevent from Positional Error of Its End Ring", Electrical Engineering Handbook, Technology & Test, No. 1, Feb. 25, 2016, p. 43-p. 44.

* cited by examiner

ROTOR, ELECTRIC MOTOR, AND ROTOR PRODUCTION METHOD

CROSS-REFERENCE TO RELATED APPLICATIONS

This application is a continuation application of PCT Application No. PCT/JP2021/026862, filed on Jul. 16, 2021, which claims the benefit of priority from Japanese Patent Application No. 2020-133110, filed on Aug. 5, 2020, the entire contents of which are incorporated herein by reference.

BACKGROUND

A rotor may include a magnet structure disposed around a shaft and a protective tube disposed around the magnet structure, as described for example, in Japanese Unexamined Patent Publication No. H7-046780. The so-called filament winding process can be used to form such a protective tube. When this process is used, for example, a fiber body (filament) that composes the protective tube is wound directly around the outer circumferential surface of a magnet structure. Then the fiber body wound around the outer circumferential surface is heat treated to form a protective tube bonded to the outer circumferential surface.

SUMMARY

An example rotor includes a cylindrical magnet structure formed including a magnet, and disposed so as to cover an outer circumferential surface of a shaft, and a protective tube formed including a fiber body wound around so as to cover an outer circumferential surface of the magnet structure, and bonded to the outer circumferential surface of the magnet structure. The protective tube includes a first end portion in an axial direction of the shaft in which the protective tube extends, and a second end portion opposite the first end portion in the axial direction. A first tapered surface gradually decreasing in diameter away from the second end portion in the axial direction is formed on a bonding surface of the outer circumferential surface of the magnet structure with the first end portion. A second tapered surface gradually decreasing in diameter away from the first end portion in the axial direction is formed on a bonding surface of the outer circumferential surface of the magnet structure with the second end portion.

DETAILED DESCRIPTION

Figure 1:
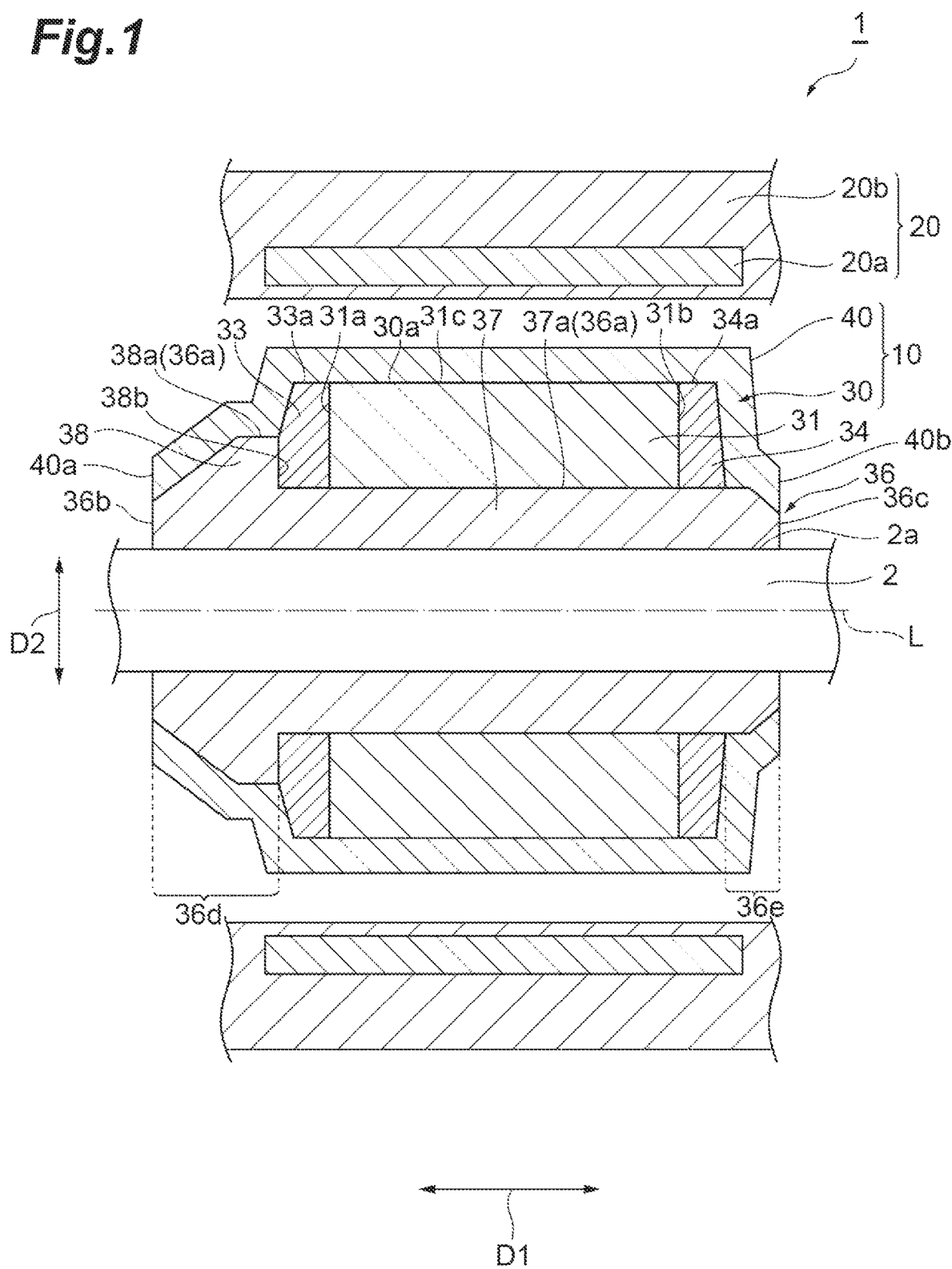
FIG. 1 is a cross-sectional view illustrating an example electric motor including a rotor.

An example rotor includes a cylindrical magnet structure formed including a magnet, and disposed so as to cover an outer circumferential surface of a shaft, and a protective tube formed including a fiber body wound around so as to cover an outer circumferential surface of the magnet structure, and bonded to the outer circumferential surface of the magnet structure. The protective tube includes a first end portion in an axial direction of the shaft in which the protective tube extends, and a second end portion opposite the first end portion in the axial direction. A first tapered surface gradually decreasing in diameter away from the second end portion in the axial direction is formed on a bonding surface of the outer circumferential surface of the magnet structure with the first end portion. A second tapered surface gradually decreasing in diameter away from the first end portion in the axial direction is formed on a bonding surface of the outer circumferential surface of the magnet structure with the second end portion.

In this example rotor, the first end portion and the second end portion of the protective tube are bonded respectively to the first tapered surface and the second tapered surface formed on the outer circumferential surface of the magnet structure. The first tapered surface to which the first end portion of the protective tube is bonded gradually decreases in diameter away from the second end portion of the protective tube in the axial direction. In this case, a bonding force of the first end portion exerted in a normal direction of the first tapered surface acts as drag on a normal direction component of the first tapered surface of a centrifugal force exerted on the first end portion during rotation of the rotor. Additionally, a force in a shear direction of the first end portion exerted in an in-plane direction of the first tapered surface acts as drag on an in-plane direction component of the first tapered surface of the centrifugal force. The second tapered surface to which the second end portion of the protective tube is bonded gradually decreases in diameter away from the first end portion of the protective tube in the axial direction. In this case, a bonding force of the second end portion exerted in a normal direction of the second tapered surface acts as drag on a normal direction component of the second tapered surface of a centrifugal force exerted on the second end portion. Additionally, a force in a shear direction of the second end portion exerted in an in-plane direction of the second tapered surface acts as drag on an in-plane direction component of the second tapered surface of the centrifugal force. Thus, at the first tapered surface and the second tapered surface, the first end portion and the second end portion are less likely to peel from the first tapered surface and the second tapered surface during rotation of the rotor due to the forces in the shear direction of the first end portion and the second end portion acting as drag on the centrifugal force, in addition to the bonding forces of the first end portion and the second end portion, during rotation of the rotor. Consequently, the rotor described above is capable of suppressing the peeling of the protective tube during rotation of the rotor.

In some examples, the magnet structure may have an inner sleeve interposed between the shaft and the magnet in a radial direction of the shaft. One end portion of the inner sleeve in the axial direction may extend to a position outside one side of the magnet in the axial direction. The first tapered surface may be formed on the one end portion of the inner sleeve. In this case, the bonding force of the first end portion of the protective tube to the first tapered surface can be more reliably ensured compared to a case in which the first tapered surface is formed on the magnet. Thus, the first end portion of the protective tube is even less likely to peel from the first tapered surface during rotation of the rotor.

In some examples, the one end portion of the inner sleeve may have a flange portion protruding outward in the radial direction. The flange portion may be positioned inward of the magnet in the radial direction. The first tapered surface may be formed on the flange portion. In this case, the distance in the radial direction from the shaft, which is the center of rotation, to the first tapered surface (radius of gyration) is smaller compared to a case in which the first tapered surface is formed on the magnet. Thus, the centrifugal force exerted on the first end portion of the protective tube bonded to the first tapered surface can be minimized. As a result, the first end portion of the protective tube is even less likely to peel from the first tapered surface during rotation of the rotor.

In some examples, another end portion of the inner sleeve in the axial direction may extend to a position outside another side of the magnet in the axial direction, and may be positioned inward of the magnet in the radial direction. The second tapered surface may be formed on the other end portion of the inner sleeve. In this case, the distance in the radial direction from the shaft, which is the center of rotation, to the second tapered surface (that is, the radius of gyration) is smaller compared to a case in which the second tapered surface is formed on the magnet. Thus, the centrifugal force exerted on the second end portion of the protective tube bonded to the second tapered surface can be minimized. As a result, the second end portion of the protective tube is even less likely to peel from the second tapered surface during rotation of the rotor.

In some examples, the magnet structure may further have a first end ring and a second end ring disposed on opposite sides of the magnet in the axial direction. The second end ring may be positioned on a side of the magnet closer to the other end portion of the inner sleeve in the axial direction. The second tapered surface may be formed on the second end ring. In a case in which an interface between the second end ring and the other end portion of the inner sleeve in the axial direction is a surface perpendicular to the axial direction, it may be difficult to wind the fiber body around the interface by the filament winding process. Thus, forming the second tapered surface on the second end ring enables the winding of the fiber body from the second end ring to the other end portion of the inner sleeve to be avoided when winding the fiber body around the outer circumferential surface of the magnet structure, so that the protective tube can be formed without gaps from the first end portion to the second end portion. That is, the protective tube that covers the outer circumferential surface of the magnet structure can be formed.

In some examples, the magnet structure may have a first end ring and a second end ring disposed on opposite sides of the magnet in the axial direction. The first tapered surface may be formed on the first end ring. The second tapered surface may be formed on the second end ring. In this case, the protective tube can be formed without gaps from the first end portion to the second end portion as described above when winding the fiber body around the outer circumferential surface of the magnet structure. That is, the protective tube that covers the outer circumferential surface of the magnet structure can be formed.

An example electric motor includes any one of the rotors described above, and a stator disposed around the rotor.

In this example electric motor, since the motor includes any one of the rotors described above, the peeling of the protective tube during rotation of the rotor can be suppressed as described above.

An example rotor production method is a method for producing any one of the rotors described above. This rotor production method includes a winding operation of winding the fiber body around the outer circumferential surface of the magnet structure to form a cylindrical fiber bundle covering the outer circumferential surface of the magnet structure, and a heat treatment operation of heat treating the cylindrical fiber bundle covering the outer circumferential surface of the magnet structure to form the protective tube.

In this example rotor production method, the protective tube bonded to the outer circumferential surface of the magnet structure can be formed by winding the fiber body around the outer circumferential surface of the magnet structure and then heat treating the cylindrical fiber bundle to the outer circumferential surface. When the rotor is produced using this method, the first end portion and the second end portion of the protective tube are bonded respectively to the first tapered surface and the second tapered surface, so that the first end portion and the second end portion are less likely to peel from the first tapered surface and the second tapered surface during rotation of the rotor as described above. Thus, the rotor production method described above is capable of obtaining the effect of suppressing the peeling of the protective tube during rotation of the rotor described above.

In some examples, in the winding operation, in a state in which a plurality of the magnet structures is aligned in the axial direction, the fiber body may be wound around from the outer circumferential surface of the magnet structure disposed on one end in the axial direction to the outer circumferential surface of the magnet structure disposed on another end in the axial direction to form the cylindrical fiber bundle collectively covering a plurality of the outer circumferential surfaces of the magnet structures. In the heat treatment operation, after the cylindrical fiber bundle covering the outer circumferential surfaces of the magnet structures is heat treated, the cylindrical fiber bundle may be cut at a boundary of the magnet structures in the axial direction to form a plurality of the protective tubes corresponding to the magnet structures. When the method of winding the fiber body around a plurality of the magnet structures collectively in this manner is employed, the production time for each rotor can be reduced compared to a case in which a method of winding the fiber body around the magnet structure individually is employed. Additionally, an increase in the amount of usage of the fiber body to be wound around each magnet structure can be suppressed. The method described above can thus improve the production efficiency of the rotor.

Hereinafter, with reference to the drawings, the same elements or similar elements having the same function are denoted by the same reference numerals, and redundant description will be omitted.

<Electric Motor>

An example electric motor 1 including a rotor 10 will be described with reference to FIG. 1. The electric motor 1 illustrated in FIG. 1 is, for example, applied in the field of aerospace. In this example, the electric motor 1 is a rotary aircraft motor, and functions as a power source for a fuel pump. The electric motor 1 may be used for other applications. FIG. 1 illustrates a cut plane of the electric motor 1 when the electric motor 1 is cut by a plane passing through an axis of rotation L of a shaft 2 described below.

As illustrated in FIG. 1, the electric motor 1 includes a rotor 10 which is a rotating component and a stator 20 which is a stationary component. The rotor 10 is fixed to the shaft 2 to which an impeller of the fuel pump is connected. The shaft 2 has a cylindrical shape with the axis of rotation L being the central axis. The shaft 2 is rotatably disposed around the axis of rotation L. The rotor 10 is rotatable about the axis of rotation L together with the shaft 2.

The stator 20 includes a cylindrical core 20*a* disposed around the rotor 10, and a coil 20*b* formed by conductive wires being wound around the core 20*a*. When an alternating current is passed through the coil 20*b* via the conductive wires, the stator 20 generates a magnetic field around the shaft 2 to cause the rotor 10 to rotate. In the description below, an axial direction D1 indicates a direction extending along the axis of rotation L. A radial direction D2 indicates a direction perpendicular to the axis of rotation L. The radial direction D2 is a radial direction of the shaft 2 and is perpendicular to the axial direction D1.

<Rotor>

The rotor 10 has a magnet structure 30 and a protective tube 40. The magnet structure 30 is disposed around the shaft 2. The magnet structure 30 has a cylindrical shape with the axis of rotation L being the central axis. The magnet structure 30 includes a magnet 31, a pair of end rings 33, 34, and an inner sleeve 36. The magnet 31 is, for example, a permanent magnet having a cylindrical shape with the axis of rotation L being the central axis. For example, neodymium magnet (Nd—Fe—B) and samarium cobalt magnet may be employed as the material for the magnet 31. The magnet 31 is disposed so as to cover an outer circumferential surface 2*a* of the shaft 2. The shaft 2 and the inner sleeve 36 are inserted through the inside of the magnet 31. The magnet 31 includes one end surface 31*a* facing one side in the axial direction D1 and another end surface 31*b* facing away from the one end surface 31*a*. The one end surface 31*a* and the other end surface 31*b* may, for example, each be a flat surface perpendicular to the axis of rotation L. The form of the magnet 31 can be changed within the scope of the present disclosure. For example, the magnet 31 may be composed of a plurality of magnet pieces divided in a circumferential direction of the shaft 2. Alternatively, the magnet 31 may be composed of a plurality of magnet pieces divided in the radial direction D2 as well as in the circumferential direction. In this case, the cylindrical magnet 31 can be formed by assembling the plurality of magnet pieces in the circumferential direction and the radial direction D2. The inner sleeve 36 may have a plurality of grooves formed on an outer circumferential surface 36*a*, and the plurality of magnet pieces constituting the magnet 31 may fit into these grooves. Alternatively, a plurality of projections (wall surfaces) may be formed projecting radially outwardly in the radial direction D2 from the outer circumferential surface 36*a* of the inner sleeve 36. Each of the magnet pieces constituting the magnet 31 may fit between the projections. The magnet pieces constituting the magnet 31 may be arranged in the circumferential direction so as to adjoin the projections in the circumferential direction.

The end ring 33 (first end ring) and the end ring 34 (second end ring) are annular (ring-shaped) members with the axis of rotation L being the central axis. For example, non-magnetic metal such as titanium (e.g., Ti-6Al-4V), thermosetting resin, and thermoplastic resin may be employed as the material for the end rings 33, 34. The end rings 33, 34 are disposed outward of the magnet 31 in the axial direction D1. The end rings 33, 34 are disposed on opposite sides of the magnet 31 in the axial direction D1. The end rings 33, 34 are disposed so as to cover, respectively, the one end surface 31*a* and the other end surface 31*b* of the magnet 31 in the axial direction D1. The end ring 33 is disposed in a position facing the one end surface 31*a* in the axial direction D1. The end ring 34 is disposed in a position facing the other end surface 31*b* in the axial direction D1. In some examples, the end ring 34 may be positioned adjacent an end portion 36*e* of the inner sleeve 36, for example on a side of the magnet 31 that is closer to the end portion 36*e* of the inner sleeve 36 in the axial direction D1.

The shaft 2 and the inner sleeve 36 are inserted through the inside of the end rings 33, 34. The end rings 33, 34 are shrink fitted to the inner sleeve 36. Inner circumferential surfaces of the end rings 33, 34 are adhered closely to the outer circumferential surface 36*a* of the inner sleeve 36. Outer diameters of outer circumferential surfaces 33*a*, 34*a* of the end rings 33, 34 may, for example, be the same as an outer diameter of an outer circumferential surface 31*c* of the magnet 31. The outer circumferential surfaces 33*a*, 34*a* may be in the same position as the outer circumferential surface 31*c* of the magnet 31 in the radial direction D2.

The end rings 33, 34 serve to transmit rotational force (torque) of the magnet 31 to the shaft 2. The rotational force of the magnet 31 is transmitted to the inner sleeve 36 via the protective tube 40 and the end rings 33, 34, and is transmitted to the shaft 2 from the inner sleeve 36. The end rings 33, 34 also serve to prevent the movement of the magnet 31 in the axial direction D1.

The inner sleeve 36 is a cylindrical member with the axis of rotation L being the central axis. For example, steel such as stainless steel (SUS) may be employed as the material for the inner sleeve 36. As mentioned above, the inner sleeve 36 is inserted through the inside of the end ring 33, the inside of the magnet 31, and the inside of the end ring 34. The inner sleeve 36 is thus interposed between the shaft 2 and the magnet 31, and between the shaft 2 and the end rings 33, 34 in the radial direction D2. An inner circumferential surface of the inner sleeve 36 is fixed to the outer circumferential surface 2*a* of the shaft 2.

The inner sleeve 36 includes one end surface 36*b* facing one side in the axial direction D1 and another end surface 36*c* facing away from the one end surface 36*b*. The one end surface 36*b* and the other end surface 36*c* may, for example, each be a flat surface perpendicular to the axis of rotation L. The one end surface 36*b* forms one end surface of the magnet structure 30 in the axial direction D1. The other end surface 36*c* forms the other end surface of the magnet structure 30 in the axial direction D1. A length of the inner sleeve 36 in the axial direction D1 is greater than a total length of the magnet 31 and the end rings 33, 34 in the axial direction D1. As a result, the inner sleeve 36 extends to positions outward of the magnet 31 with respect to the end rings 33, 34 in the axial direction D1.

One end portion 36*d* of the inner sleeve 36 in the axial direction D1 (that is, an end portion including the one end surface 36*b* of the inner sleeve 36) projects to a position outside one side of the magnet 31 with respect to the end ring 33 in the axial direction D1. The one end portion 36*d* projects to a side of the end ring 33 opposite the magnet 31. Another end portion 36*e* of the inner sleeve 36 in the axial direction D1 (that is, an end portion including the other end surface 36*c* of the inner sleeve 36) projects to a position outside the other side of the magnet 31 with respect to the end ring 34 in the axial direction D1. The other end portion 36e projects to a side of the end ring 34 opposite the magnet 31.

The inner sleeve 36 includes a cylindrical body portion 37 that extends along the axial direction D1 from the one end surface 36b to the other end surface 36c, and a flange portion 38 that protrudes outward in the radial direction D2 from an outer circumferential surface 37a of the cylindrical body portion 37. The cylindrical body portion 37 has a cylindrical shape with the axis of rotation L being the central axis. The flange portion 38 is provided on the one end portion 36d of the inner sleeve 36. The flange portion 38 protrudes outward in the radial direction D2 from the outer circumferential surface 37a of the cylindrical body portion 37 to a position facing the magnet 31 in the axial direction D1 with the end ring 33 interposed therebetween. A maximum outer diameter of the flange portion 38 (for example, an outer diameter of a circumferential surface S1 described further below) is smaller than the outer diameter of the outer circumferential surface 31c of the magnet 31, the outer diameter of the outer circumferential surface 33a of the end ring 33, and the outer diameter of the outer circumferential surface 34a of the end ring 34. As a result, the flange portion 38 is positioned inward of the magnet 31, the end ring 33, and the end ring 34 in the radial direction D2. Namely, in the radial direction D2 of the magnet structure 30, the flange portion 38 is positioned inward of the outer circumferential surface 31c of the magnet 31, of the outer circumferential surface 33a of the end ring 33, and of the outer circumferential surface 34a of the end ring 34.

Figure 2:
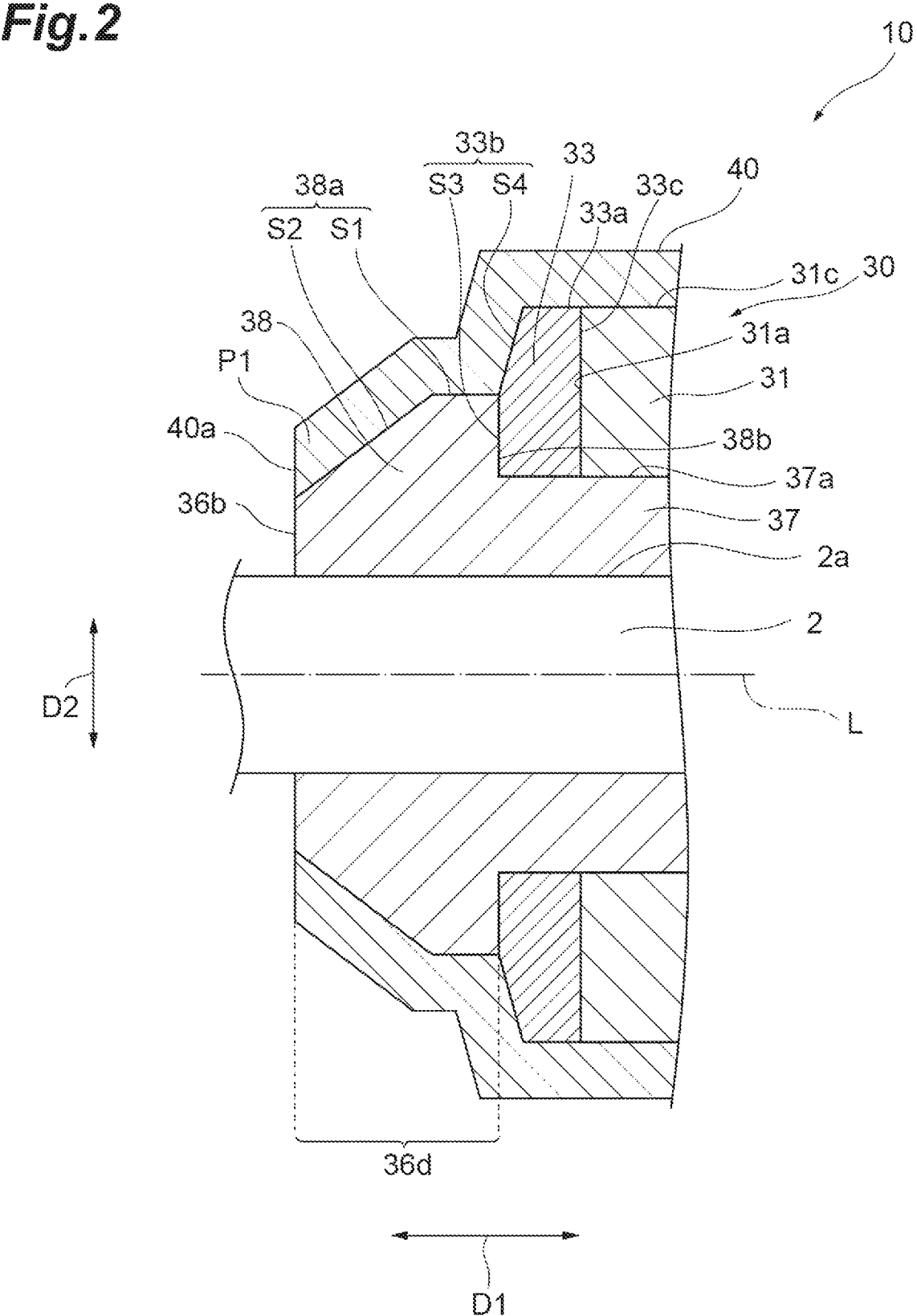
FIG. 2 is an enlarged view illustrating one end in an axial direction of the rotor of FIG. 1.

FIG. 2 illustrates an enlarged view of the vicinity of the one end portion 36d of the rotor 10 of FIG. 1. As illustrated in FIG. 2, the flange portion 38 provided on the one end portion 36d includes an end surface 38b that connects an outer circumferential surface 38a of the flange portion 38 to the outer circumferential surface 37a of the cylindrical body portion 37 in the radial direction D2. The end surface 38b faces away from the one end surface 36b in the axial direction D1. The end surface 38b faces the end ring 33 (for example, a perpendicular surface S3 of one end surface 33b described further below) in the axial direction D1. The end surface 38b may, for example, be a flat surface perpendicular to the axis of rotation L.

The outer circumferential surface 38a of the flange portion 38 has a tapered surface S2 (first tapered surface) formed thereon. The tapered surface S2 is formed on a portion of the outer circumferential surface 38a excluding the circumferential surface S1. The circumferential surface S1 follows along an outer circumferential surface of a cylinder having the axis of rotation L as the central axis. A normal direction of the circumferential surface S1 is along the radial direction D2. The circumferential surface S1 is positioned on the outer circumferential surface 38a closer to the end surface 38b in the axial direction D1. The tapered surface S2 connects the circumferential surface S1 to the one end surface 36b. The tapered surface S2 is inclined with respect to the circumferential surface S1 and the one end surface 36b. For example, the tapered surface S2 gradually decreases in diameter away from the end surface 38b (that is, away from another end portion P2 of the protective tube 40 described further below) in the axial direction D1. The tapered surface S2 is tapered inward in the radial direction D2 as it gets closer to the one end surface 36b from the end surface 38b in the axial direction D1. Accordingly, the tapered surface S2 gradually decreases in diameter toward the end surface 36b of the magnet structure 30.

As a result, the tapered surface S2 is inclined with respect to the axial direction D1, and a normal direction of the tapered surface S2 is inclined with respect to the radial direction D2. The angle of the normal direction of the tapered surface S2 with respect to the radial direction D2 is in an interval ranging from greater than 0° to less than 90°. The angle of the normal direction of the tapered surface S2 with respect to the radial direction D2 may, for example, be in an interval ranging from greater than 0° to equal to or less than 45°, or in an interval ranging from greater than 45° to less than 90°. For example, the tapered surface S2 of the magnet structure 30 may extend away from the end surface 36b at an angle with respect to the axial direction D1 of the magnet structure 30, that is within an interval ranging from greater than 0° to equal to or less than 45° in some examples, or within an interval ranging from greater than 45° to less than 90° in other examples.

As described above, the flange portion 38 provided on the one end portion 36d is positioned inward of the magnet 31, the end ring 33, and the end ring 34 in the radial direction D2. The tapered surface S2 formed on the flange portion 38 is thus also positioned inward of the magnet 31, the end ring 33, and the end ring 34 in the radial direction D2. The tapered surface S2 is positioned inward of the outer circumferential surface 31c of the magnet 31, the outer circumferential surface 33a of the end ring 33, and the outer circumferential surface 34a of the end ring 34 in the radial direction D2.

As illustrated in FIG. 2, the end ring 33 includes the one end surface 33b that faces the end surface 38b of the flange portion 38 in the axial direction D1, and another end surface 33c that faces the one end surface 31a of the magnet 31 in the axial direction D1. The one end surface 33b and the other end surface 33c connect the outer circumferential surface 33a of the end ring 33. The other end surface 33c may, for example, be a flat surface perpendicular to the axis of rotation L. The one end surface 31b has an inclined surface S4 that is inclined from the perpendicular surface S3 perpendicular to the axis of rotation L formed thereon. The perpendicular surface S3 is positioned facing the end surface 38b of the flange portion 38 in the axial direction D1. The inclined surface S4 is positioned outward of the circumferential surface S1 of the flange portion 38 in the radial direction D2. The inclined surface S4 connects the perpendicular surface S3 to the outer circumferential surface 33a. The inclined surface S4 is inclined so as to approach the other end surface 33c in the axial direction D1 moving outward in the radial direction D2.

Figure 3:
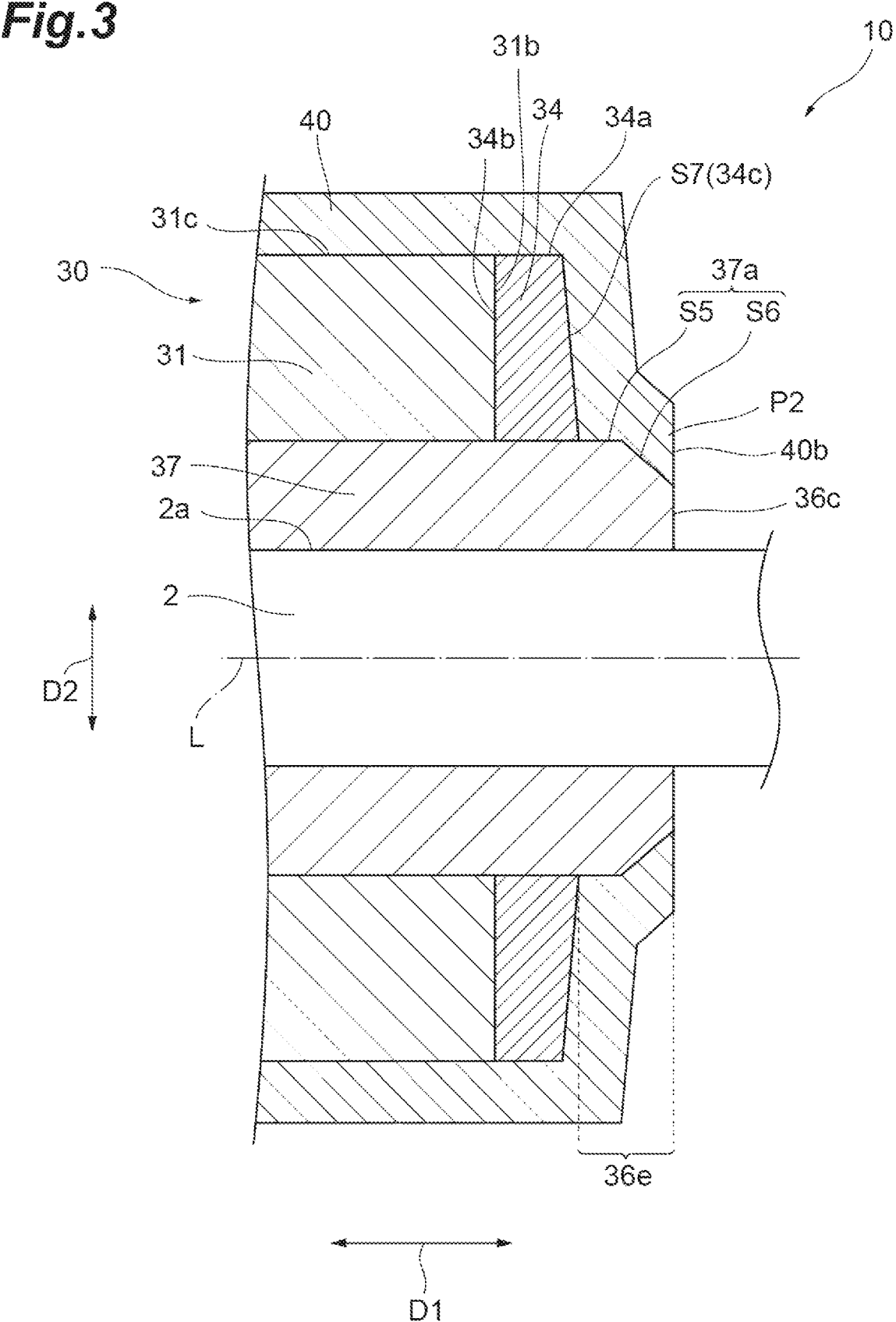
FIG. 3 is an enlarged view illustrating the other end in the axial direction of the rotor of FIG. 1.

FIG. 3 illustrates an enlarged view of the vicinity of the other end portion 36e of the rotor 10 shown in FIG. 1. As illustrated in FIG. 3, the outer circumferential surface 37a of the cylindrical body portion 37 at the other end portion 36e has a tapered surface S6 (second tapered surface) formed thereon. The tapered surface S6 is positioned between a circumferential surface S5 of the outer circumferential surface 37a and the other end surface 36c. The circumferential surface S5 follows along an outer circumferential surface of a cylinder having the axis of rotation L as the central axis. A normal direction of the circumferential surface S5 is along the radial direction D2. An outer diameter of the other end portion 36e is defined by an outer diameter of the circumferential surface S5. The outer diameter of the circumferential surface S5 is smaller than the outer diameter of the outer circumferential surface 31c of the magnet 31, the outer diameter of the outer circumferential surface 33a of the end ring 33, and the outer diameter of the outer circumferential surface 34a of the end ring 34. As a result, the other end portion 36e is positioned inward of the magnet 31, the end ring 33, and the end ring 34 in the radial direction D2.

The tapered surface S6 connects the circumferential surface S5 to the other end surface 36c. The tapered surface S6 is inclined with respect to the circumferential surface S5 and the other end surface 36c. For example, the tapered surface S6 gradually decreases in diameter as it gets closer to the other end surface 36c (that is, away from one end portion P1 of the protective tube 40 described further below) in the axial direction D1. The tapered surface S6 is tapered inward in the radial direction D2 as it gets closer to the other end surface 36c in the axial direction D1. Accordingly, the tapered surface S6 gradually decreases in diameter toward the end surface 36c opposite the first end surface 36b in the axial direction D1 of the magnet structure 30.

As a result, the tapered surface S6 is inclined with respect to the axial direction D1, and a normal direction of the tapered surface S6 is inclined with respect to the radial direction D2. The angle of the normal direction of the tapered surface S6 with respect to the radial direction D2 is in an interval ranging from greater than 0° to less than 90°. For example, the tapered surface S6 of the magnet structure 30 may extend away from the end surface 36c at an angle with respect to the axial direction D1 of the magnet structure 30, that is within an interval ranging from greater than 45° to less than 90°. The angle of the normal direction of the tapered surface S6 with respect to the radial direction D2 may be the same as the angle of the normal direction of the tapered surface S2 (see FIG. 2) with respect to the radial direction D2. Alternatively, the angle of the normal direction of the tapered surface S6 with respect to the radial direction D2 may be greater than or smaller than the angle of the normal direction of the tapered surface S2 with respect to the radial direction D2. Accordingly, given a first angle at which the tapered surface S2 of the magnet structure 30 extends away from the end surface 36b with respect to the axial direction D1 of the magnet structure 30, the tapered surface S6 may extend away from the end surface 36c at a second angle with respect to the axial direction D1, that is different from the first angle.

As described above, the other end portion 36e is positioned inward of the magnet 31, the end ring 33, and the end ring 34 in the radial direction D2. The tapered surface S6 formed on the other end portion 36e is thus also positioned inward of the magnet 31, the end ring 33, and the end ring 34 in the radial direction D2. The tapered surface S6 is positioned inward of the outer circumferential surface 31c of the magnet 31, the outer circumferential surface 33a of the end ring 33, and the outer circumferential surface 34a of the end ring 34 in the radial direction D2.

As illustrated in FIG. 3, the end ring 34 includes one end surface 34b that faces the other end surface 31b of the magnet 31 in the axial direction D1, and another end surface 34c that faces away from the one end surface 34b in the axial direction D1. The one end surface 34b and the other end surface 34c connect the outer circumferential surface 34a of the end ring 34. The one end surface 34b may, for example, be a flat surface perpendicular to the axis of rotation L. The other end surface 34c has an inclined surface S7 that is inclined from a plane perpendicular to the axis of rotation L formed thereon. The inclined surface S7 is formed on the entirety of the other end surface 34c. The inclined surface S7 is inclined so as to approach the one end surface 34b in the axial direction D1 moving outward in the radial direction D2. As a result, the inclined surface S7 is inclined with respect to the plane perpendicular to the axis of rotation L.

Reference is made again to FIG. 1. The protective tube 40 is a cylindrical member with the axis of rotation L being the central axis. The protective tube 40 includes one end surface 40a facing one side in the axial direction D1 and another end surface 40b facing away from the one end surface 40a in the axial direction D1. The magnet structure 30 is disposed inside the protective tube 40. A length of the protective tube 40 in the axial direction D1 is, for example, the same as a length of the magnet structure 30 in the axial direction D1. The one end surface 40a of the protective tube 40 is in the same position as the one end surface 36b of the magnet structure 30 in the axial direction D1. The other end surface 40b of the protective tube 40 is in the same position as the other end surface 36c of the magnet structure 30 in the axial direction D1. Thus, the one end surface 40a of the protective tube 40 is flush with the one end surface 36b of the magnet structure 30. The other end surface 40b of the protective tube 40 is flush with the other end surface 36c of the magnet structure 30.

The protective tube 40 covers the entirety of an outer circumferential surface 30a of the magnet structure 30. An inner circumferential surface of the protective tube 40 is bonded (adhered) to the outer circumferential surface 30a of the magnet structure 30. For example, the inner circumferential surface of the protective tube 40 is bonded to the outer circumferential surface 31c of the magnet 31, the outer circumferential surface 33a of the end ring 33, the outer circumferential surface 34a of the end ring 34, the outer circumferential surface 38a of the flange portion 38 of the inner sleeve 36, and the outer circumferential surface 37a of the other end portion 36e of the inner sleeve 36.

The protective tube 40 serves to prevent fragments of the magnet 31 from scattering in the radial direction D2 when the magnet 31 is damaged. The protective tube 40 may have a certain degree of rigidity to suppress distortion of the magnet 31 to reduce the possibility of damage of the magnet 31. The protective tube 40 is formed, for example, by including a fiber body 40F such as of carbon fiber reinforced plastic (CFRP). The material for the fiber body 40F is not limited to CFRP, and may be other material such as glass fiber reinforced plastic (GFRP).

Figure 4:
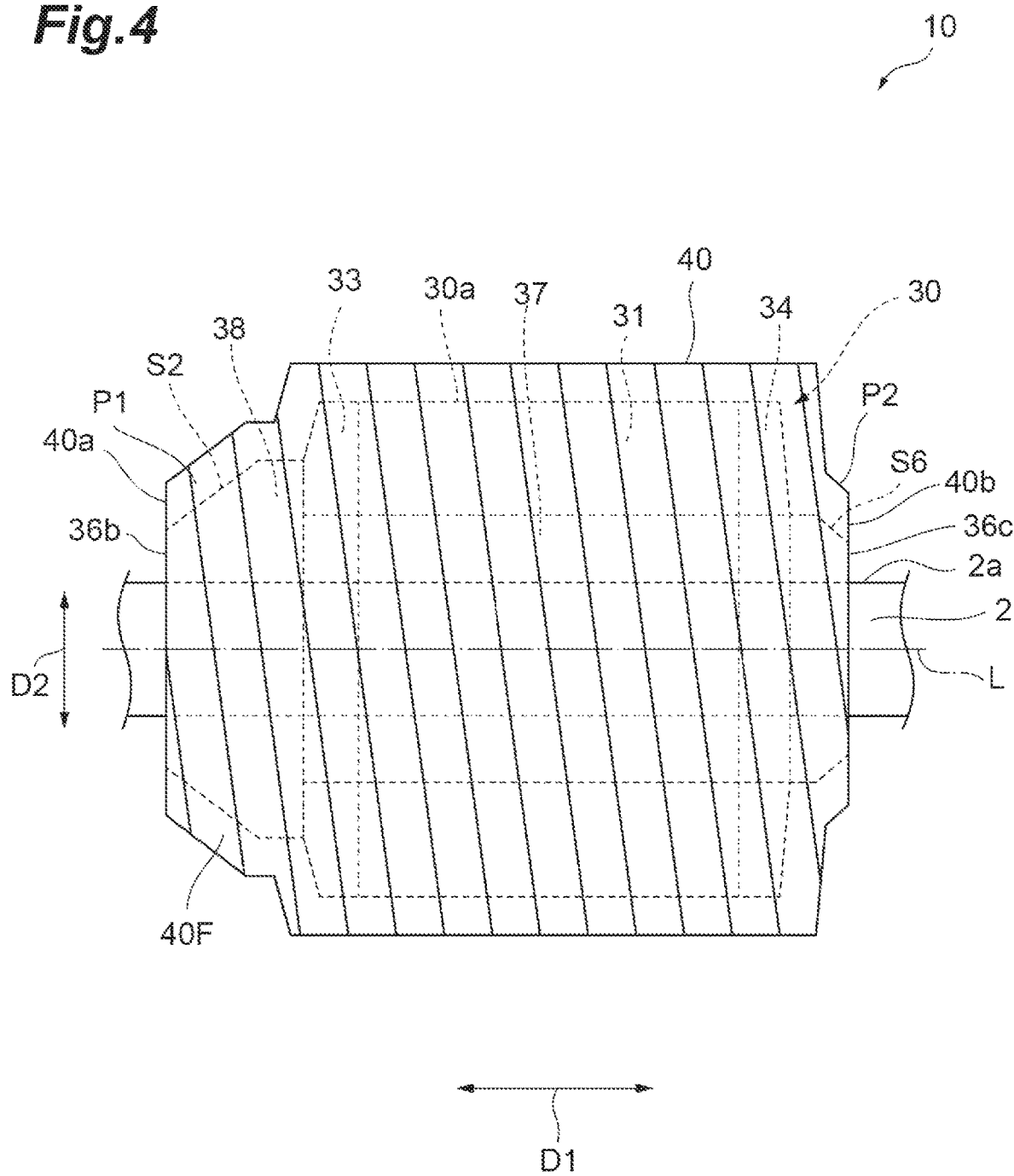
FIG. 4 is a side view illustrating the rotor of FIG. 1.

FIG. 4 illustrates a side surface of the rotor 10 when viewed in the direction perpendicular to the axis of rotation L. As illustrated in FIG. 4, the protective tube 40 has a configuration in which the fiber body 40F (filament) is wound around the outer circumferential surface 30a of the magnet structure 30 a plurality of times. The filament winding process can be used to form the protective tube 40 having such configuration. When the filament winding process is used, for example, the fiber body 40F which is impregnated with resin (for example, a thermosetting adhesive) is wound directly around the outer circumferential surface 30a of the magnet structure 30, and then the resin is heat cured. The protective tube 40 bonded to the outer circumferential surface 30a of the magnet structure 30 can thus be formed. A thickness of the protective tube 40 in the radial direction D2 is, for example, 1.5 mm or more and 2 mm or less.

When the fiber body 40F is wound around the outer circumferential surface 30a of the magnet structure 30 using the filament winding process, a leading end which is the start of the winding (or a trailing end which is the end of the winding) of the fiber body 40F is positioned at the one end portion P1 (first end portion) of the protective tube 40 in the axial direction D1. The trailing end which is the end of the winding (or the leading end which is the start of the winding) of the fiber body 40F is positioned at the other end portion P2 (second end portion) of the protective tube 40 in the axial direction D1. The one end portion P1 of the protective tube 40 can be defined as a portion of the protective tube 40 closer to the one end surface 40a including at least a portion of the leading end (or the trailing end) of the fiber body 40F. The other end portion P2 of the protective tube 40 can be defined as a portion of the protective tube 40 adjacent (e.g., closer to) the other end surface 40b including at least a portion of the trailing end (or the leading end) of the fiber body 40F.

As illustrated in FIG. 2, the one end portion P1 of the protective tube 40 is positioned on the tapered surface S2 of the flange portion 38, and is bonded to the tapered surface S2. The tapered surface S2 is thus a bonding surface (bonding portion) of the outer circumferential surface 30a of the magnet structure 30 with the one end portion P1. The one end portion P1 may be bonded not only to the tapered surface S2, but also to other elements such as the circumferential surface S1. As illustrated in FIG. 3, the other end portion P2 of the protective tube 40 is positioned on the tapered surface S6 of the cylindrical body portion 37, and is bonded to the tapered surface S6. The tapered surface S6 is thus a bonding surface (bonding portion) of the outer circumferential surface 30a of the magnet structure 30 with the other end portion P2. The other end portion P2 may be bonded not only to the tapered surface S6, but also to other elements such as the circumferential surface S5. According to examples, outer circumferential surfaces of the end portions P1 and P2 of the protective tube 40 may be exposed to form an outer surface of the rotor 10.

<Rotor Production Method>

A production method of the rotor 10 will next be described with reference to FIGS. 5A, 5B, 6A, and 6B. When forming the protective tube 40, the filament winding process is applied collectively to a plurality of the magnet structures 30. That is, a plurality of the magnet structures 30 arranged in series in the axial direction D1 is collectively wound around with the fiber body 40F to form the protective tube 40.

Figure 5A:
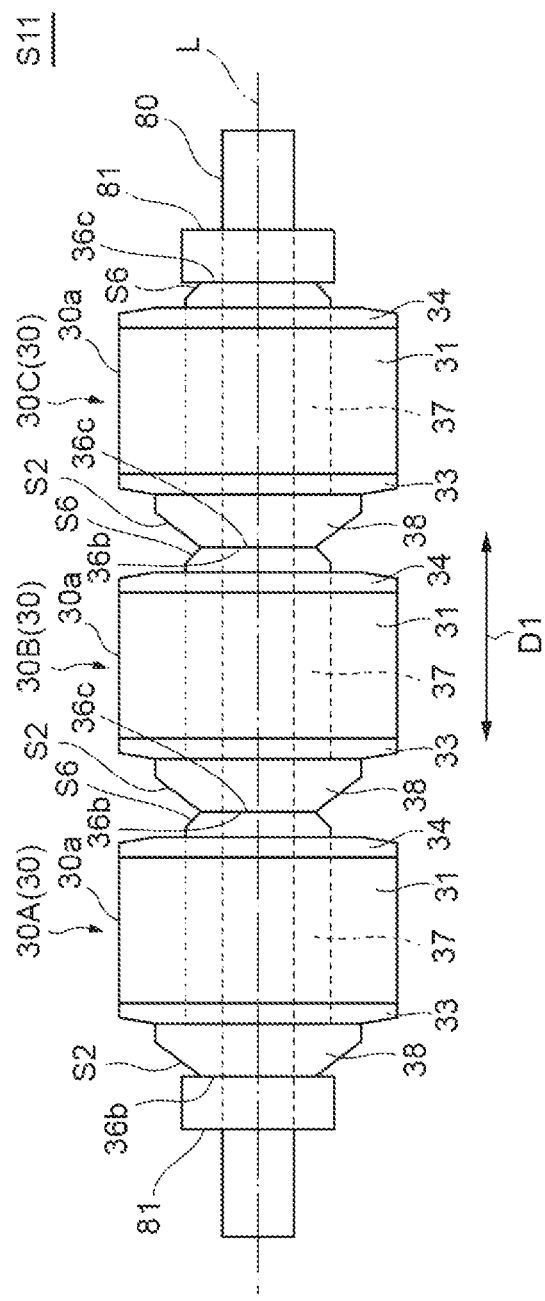
FIG. 5A is a side view illustrating an example of a production operation of the rotor of FIG. 1.

The magnet structure 30 which has the tapered surfaces S2 and S6 formed thereon is first prepared. The inner sleeve 36 which has the tapered surfaces S2 and S6 formed thereon is inserted through the inside of the magnet 31, the end ring 33, and the end ring 34 to obtain the magnet structure 30. Then, as illustrated in FIG. 5A, a plurality of the magnet structures 30 is arranged along the axial direction D1 (arranging operation S11). In doing so, a cylindrical jig 80 is inserted through the inside of each magnet structure 30, and the plurality of the magnet structures 30 is fastened in the axial direction D1 by a pair of fastening members 81 such as nuts. In this way, the plurality of the magnet structures 30 is held arranged in series in the axial direction D1.

The magnet structures 30 are arranged such that the flange portion 38 of each of the magnet structures 30 is oriented toward one side in the axial direction D1. Here, the magnet structure 30 positioned at one end in the axial direction D1 among the plurality of the magnet structures 30 is referred to as a "magnet structure 30A." The magnet structure 30 positioned at the other end in the axial direction D1 is referred to as a "magnet structure 30C." The magnet structure 30 disposed between the magnet structures 30A and 30C is referred to as a "magnet structure 30B." When the magnet structures 30A, 30B, and 30C are not described separately, the magnet structures 30A, 30B, and 30C are collectively referred to as the "magnet structures 30." The one end surface 36b of the magnet structure 30A abuts against one of the fastening members 81 in the axial direction D1. The other end surface 36c of the magnet structure 30A abuts against the one end surface 36b of the magnet structure 30B. The other end surface 36c of the magnet structure 30B abuts against the one end surface 36b of the magnet structure 30C. The other end surface 36c of the magnet structure 30C abuts against the other fastening member 81.

Figure 5B:
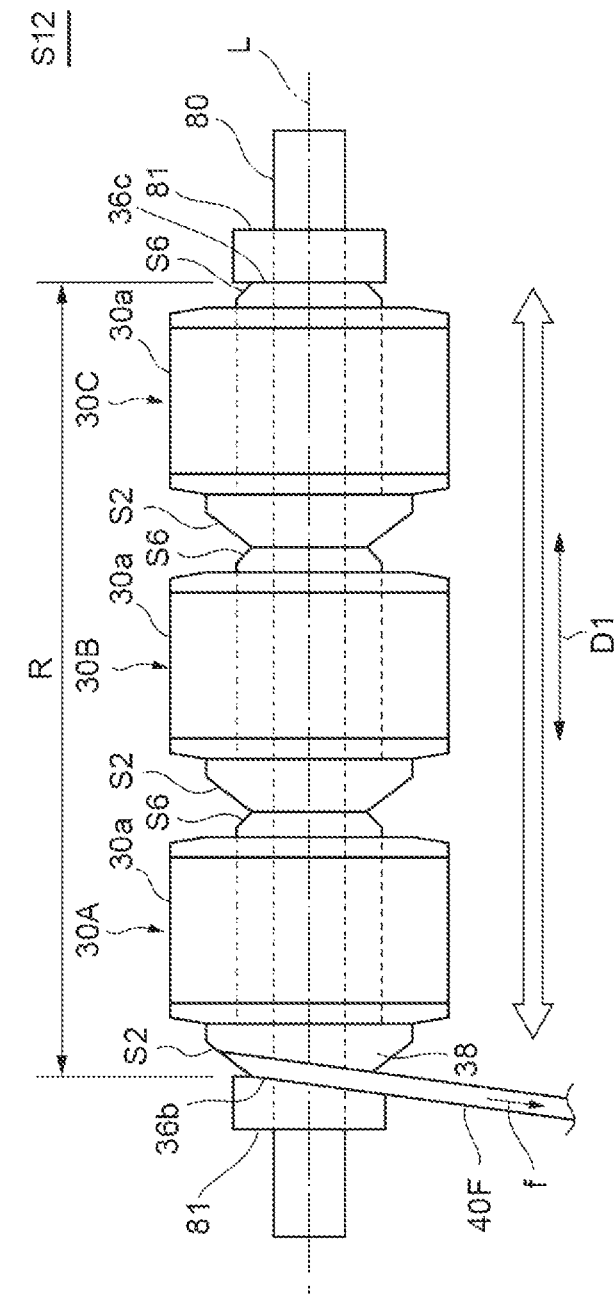
FIG. 5B is a side view illustrating a subsequent operation of FIG. 5A.

Next, as illustrated in FIG. 5B, the magnet structures 30A, 30B, and 30C are collectively wound around with the fiber body 40F that composes the protective tube 40 (winding operation S12). That is, the fiber body 40F is wound around from the outer circumferential surface 30a of the magnet structure 30A to the outer circumferential surface 30a of the magnet structure 30C. For example, the leading end of the fiber body 40F is disposed on the tapered surface S2 of the flange portion 38 of the magnet structure 30A. The fiber body 40F is then wound around the outer circumferential surfaces 30a of the magnet structures 30A, 30B, and 30C from the magnet structure 30A toward the magnet structure 30C in the axial direction D1. In doing so, the fiber body 40F is wound around by rotating the jig 80 about the axis of rotation L while imparting tension fn in a direction of extension of the fiber body 40F.

After the fiber body 40F is wound around the magnet structure 30C, the fiber body 40F is wound around from the magnet structure 30C toward the magnet structure 30A. In this way, the winding of the fiber body 40F around the outer circumferential surfaces 30a of the magnet structures 30A, 30B, and 30C is repeated a plurality of times in a section R from the one end surface 36b of the magnet structure 30A to the other end surface 36c of the magnet structure 30C. The winding of the fiber body 40F then ends at the tapered surface S6 of the magnet structure 30C. At this time, the trailing end of the fiber body 40F is disposed on the tapered surface S6 of the magnet structure 30C. A cylindrical fiber bundle formed around the magnet structures 30A, 30B, 30C by the winding of the fiber body 40F is referred to as a "cylindrical fiber bundle 41F" (see FIG. 6A). The cylindrical fiber bundle 41F collectively covers the outer circumferential surfaces 30a of the magnet structures 30A, 30B, and 30C. The cylindrical fiber bundle 41F is formed by winding the fiber body 40F around so as to reciprocate between the one end surface 36b of the magnet structure 30A and the other end surface 36c of the magnet structure 30C a plurality of times. However, the fiber body 40F can be wound around without reciprocating in this manner. For example, the fiber body 40F can be wound around by stacking the fiber body 40F in layers in the radial direction D2 in a section from the one end surface 36b of the magnet structure 30A to the other end surface 36c of the magnet structure 30C. In this case, the cylindrical fiber bundle 41F can be formed without reciprocating the fiber body 40F during the winding.

Figure 6A:
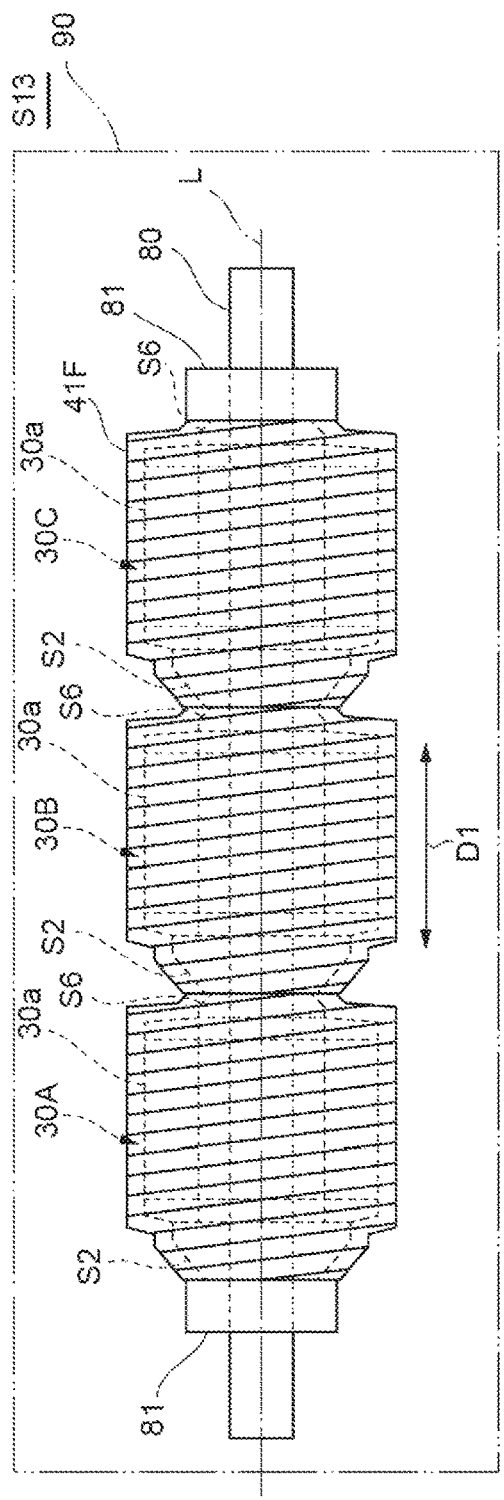
FIG. 6A is a side view illustrating a subsequent operation of FIG. 5B.

Next, the cylindrical fiber bundle 41F that covers the outer circumferential surfaces 30a of the magnet structures 30A, 30B, and 30C is heat treated to form protective tubes 40A, 40B, and 40C which correspond respectively to the magnet structures 30A, 30B, and 30C (heat treating operation S13). For example, as illustrated in FIG. 6A, the magnet structures 30A, 30B, and 30C which are covered by the cylindrical fiber bundle 41F are disposed inside a furnace 90 together with the jig 80. The resin impregnated into the cylindrical fiber bundle 41F is then heat cured inside the furnace 90, to thereby bond an inner circumferential surface of the cylindrical fiber bundle 41F to the outer circumferential surfaces 30a of the magnet structures 30A, 30B, and 30C. At this time, portions of the cylindrical fiber bundle 41F corresponding to the one end portion P1 and the other end portion P2 of the protective tube 40 are bonded to the tapered surfaces S2 and S6 of the magnet structures 30A, 30B, and 30C.

Figure 6B:
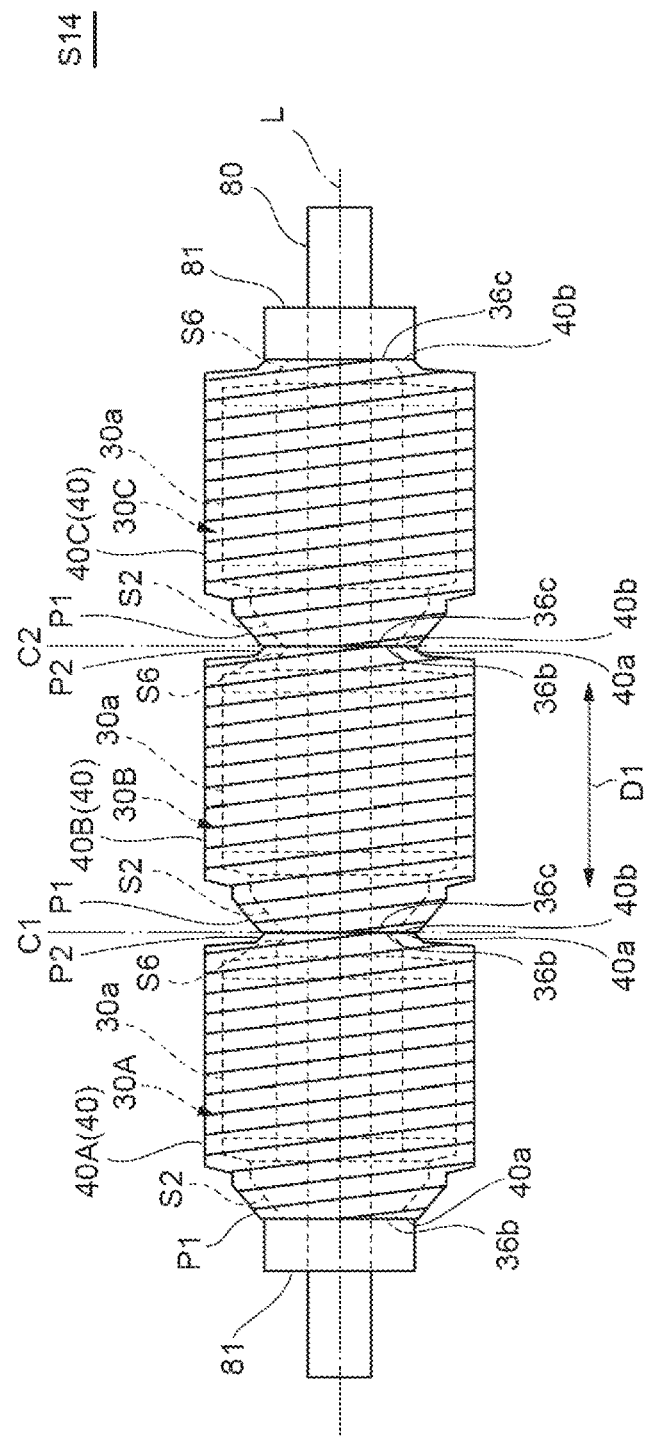
FIG. 6B is a side view illustrating a subsequent operation of FIG. 6A.

Next, as illustrated in FIG. 6B, after removing the magnet structures 30A, 30B, and 30C to which the cylindrical fiber bundle 41F is bonded from the furnace 90, the cylindrical fiber bundle 41F is cut into the magnet structures 30A, 30B, and 30C (cutting operation S14). For example, the cylindrical fiber bundle 41F is cut along cutting planes C1 and C2. The cutting plane C1 is an interface between the magnet structures 30A and 30B adjacent in the axial direction D1, that is, an abutting surface between the other end surface 36c of the magnet structure 30A and the one end surface 36b of the magnet structure 30B. The cutting plane C2 is an interface between the magnet structures 30B and 30C adjacent in the axial direction D1, that is, an abutting surface between the other end surface 36c of the magnet structure 30B and the one end surface 36b of the magnet structure 30C.

The protective tubes 40A, 40B, and 40C respectively corresponding to the magnet structures 30A, 30B, and 30C are formed by cutting the cylindrical fiber bundle 41F along the cutting planes C1 and C2. That is, the protective tube 40A that is bonded to the outer circumferential surface 30a of the magnet structure 30A, the protective tube 40B that is bonded to the outer circumferential surface 30a of the magnet structure 30B, and the protective tube 40C that is bonded to the outer circumferential surface 30a of the magnet structure 30C are formed from the cylindrical fiber bundle 41F. The cylindrical fiber bundle 41F may be cut along the cutting planes C1 and C2 using, for example, a cutting tool such as a cutter.

The protective tube 40A obtained by cutting along the cutting plane C1 has the fiber body 40F wound around the outer circumferential surface 30a of the magnet structure 30A from the one end surface 36b to the other end surface 36c. It may be considered that the trailing end of the fiber body 40F is positioned at the other end surface 36c which is the cutting plane C1. Similarly, it may be considered that the leading end and the trailing end of the fiber body 40F are positioned at the one end surface 36b and the other end surface 36c of the protective tube 40B. Similarly, it may be considered that the leading end of the fiber body 40F is positioned at the one end surface 36b of the protective tube 40C. Thus, the leading ends and the trailing ends of the fiber body 40F are respectively positioned at the one end portions P1 and the other end portions P2 of the protective tubes 40A, 40B, and 40C.

The protective tube 40 bonded to the magnet structure 30 is obtained through the operations above. Thereafter, the shaft 2 is inserted through the inside of the magnet structure 30 to obtain the rotor 10 illustrated in FIG. 1. The operations described above illustrate an example in which three magnet structures 30A, 30B, and 30C are arranged in series in the axial direction D1. However, the number of the magnet structures 30 arranged in the axial direction D1 is not limited to three, and may be two, or four or more.

In the operations described above, the filament winding process is applied collectively to the magnet structures 30A, 30B, and 30C. However, the filament winding process may be applied to the magnet structures 30A, 30B, and 30C separately. That is, the protective tube 40 may be formed by winding the fiber body 40F around one magnet structure 30. In this case, the fiber body 40F is wound around the outer circumferential surface 30a of the magnet structure 30 in a section from the one end surface 36b to the other end surface 36c of the magnet structure 30. Then, similarly to the process described above, the magnet structure 30 covered with the cylindrical fiber bundle 41F is disposed inside the furnace 90 to heat cure the resin impregnated into the cylindrical fiber bundle 41F. In this way, the protective tube 40 bonded to the outer circumferential surface 30a of the magnet structure 30 is formed. Even when this method is used, the leading end of the fiber body 40F is positioned at the one end portion P1 of the protective tube 40, and the trailing end of the fiber body 40F is positioned at the other end portion P2 of the protective tube 40.

<Operation and Effect>

Figure 9A:
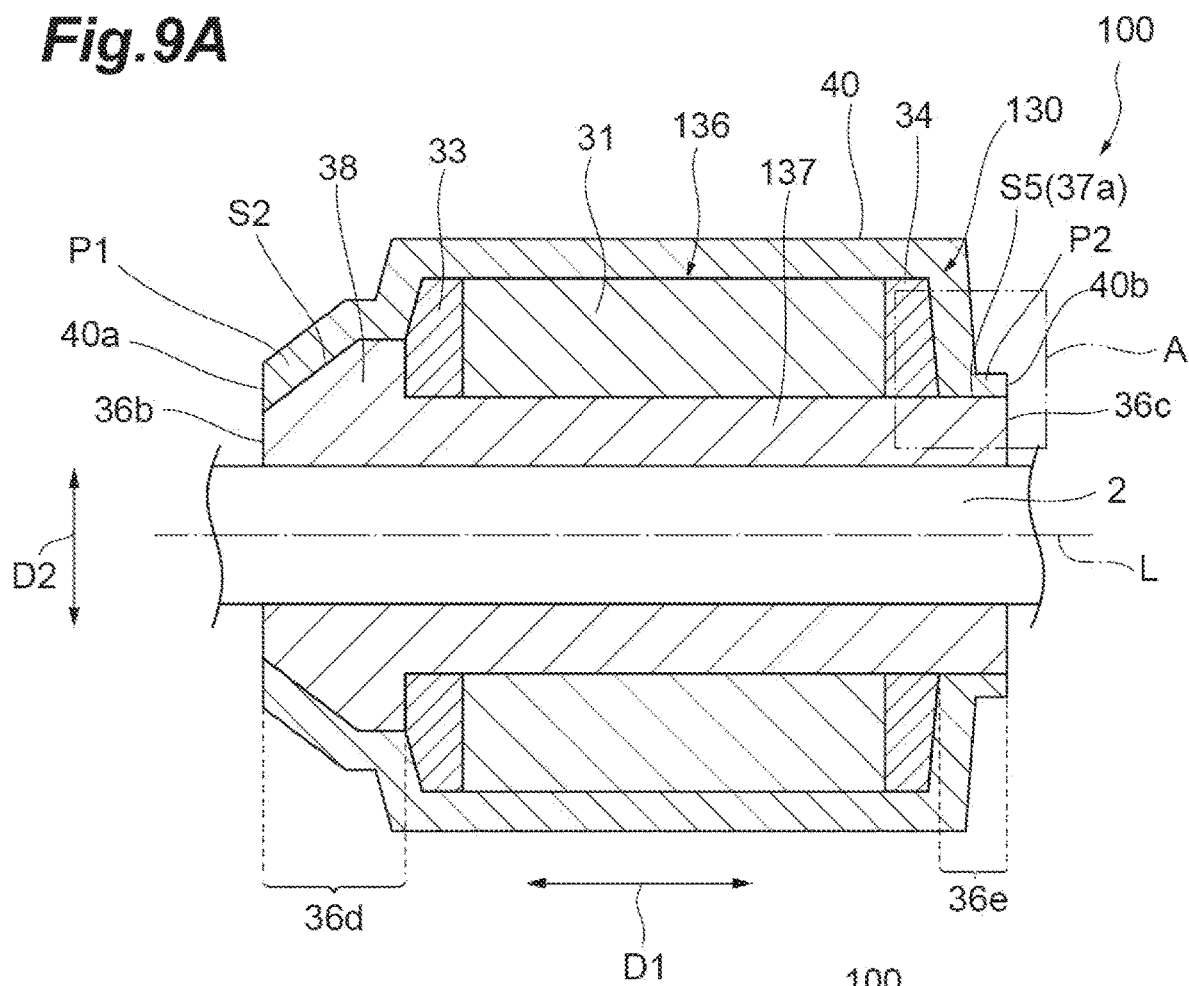
FIG. 9A is a cross-sectional view illustrating a comparative example rotor.
Figure 9B:
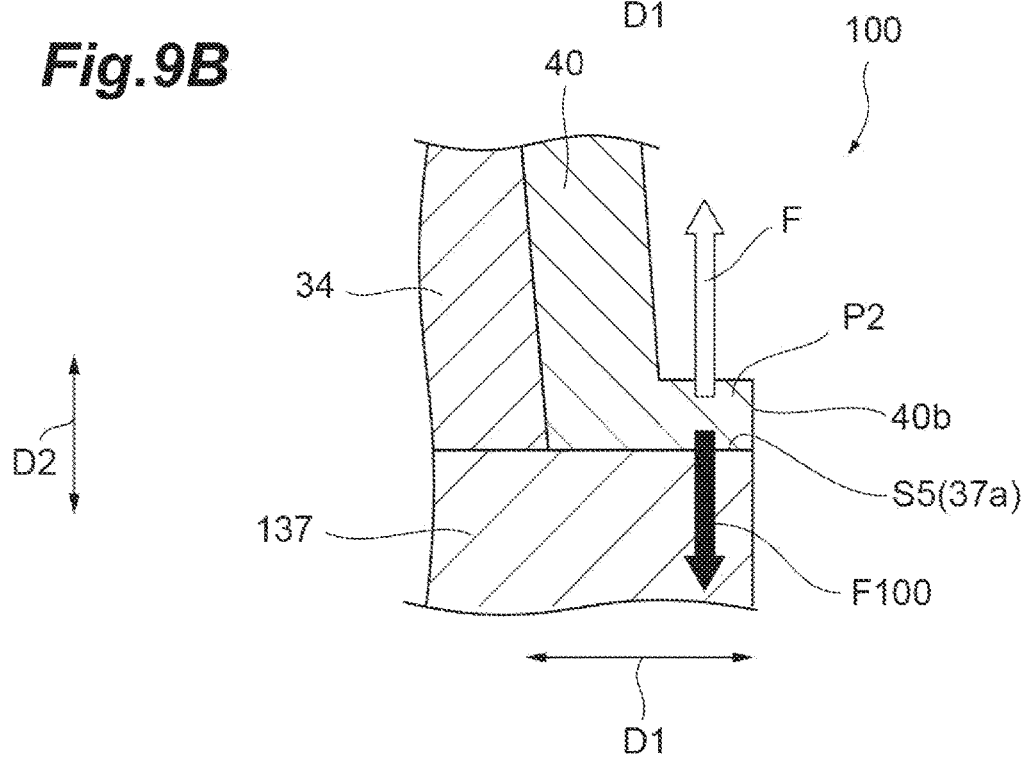
FIG. 9B is an enlarged view illustrating a portion of the rotor of FIG. 9A.

The operation and effect of the example rotor 10, of the example electric motor 1, and of the example method of producing or manufacturing the rotor 10 will next be described. FIG. 9A illustrates a comparative example rotor 100. FIG. 9B illustrates an enlarged portion A of the rotor 100 shown in FIG. 9A. The rotor 100 is different from the rotor 10 described above in that no tapered surfaces are formed on the other end portion 36e of an inner sleeve 136. Thus, as illustrated in FIG. 9A, at the other end portion 36e, the circumferential surface S5 of a cylindrical body portion 137 is connected directly to the other end surface 36c, and the other end portion P2 of the protective tube 40 is bonded to the circumferential surface S5.

In the rotor 100 according to the comparative example, as illustrated in FIG. 9B, the protective tube 40 is subjected to external forces exerted outward in the radial direction D2 such as a centrifugal force F and wind pressure during rotation of the rotor 100. The centrifugal force F on the other end portion P2 of the protective tube 40 is exerted outward in the radial direction D2. A bonding force F100 of the other end portion P2 in the normal direction of the circumferential surface S5 (that is, inward in the radial direction D2) acts as drag on the centrifugal force F. In this case, when the centrifugal force F is greater than the bonding force F100, the other end portion P2 will peel from the circumferential surface S5.

When forming the protective tubes 40, the leading ends and the trailing ends of the fiber body 40F are respectively positioned at the one end portions P1 and the other end portions P2 of the protective tubes 40 as described above, in the case in which the filament winding process is applied to magnet structures 130 individually and in the case in which the filament winding process is applied collectively to the magnet structures 130. Thus, in either case, the protective tube 40 tends to peel from the outer circumferential surface 30a of the magnet structure 130 during rotation of the rotor 100 starting from the one end portion P1 and the other end portion P2.

Figure 7A:
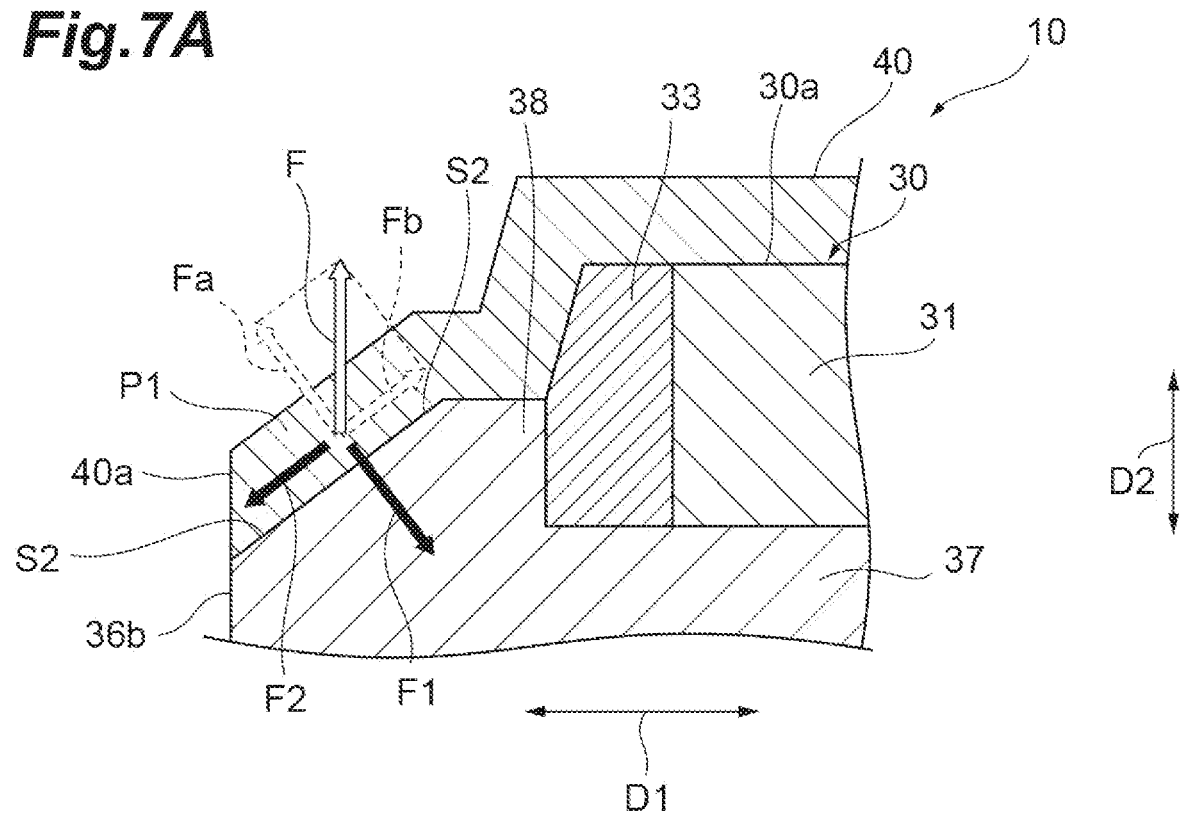
FIG. 7A is an enlarged view illustrating a portion of the rotor of FIG. 2.
Figure 7B:
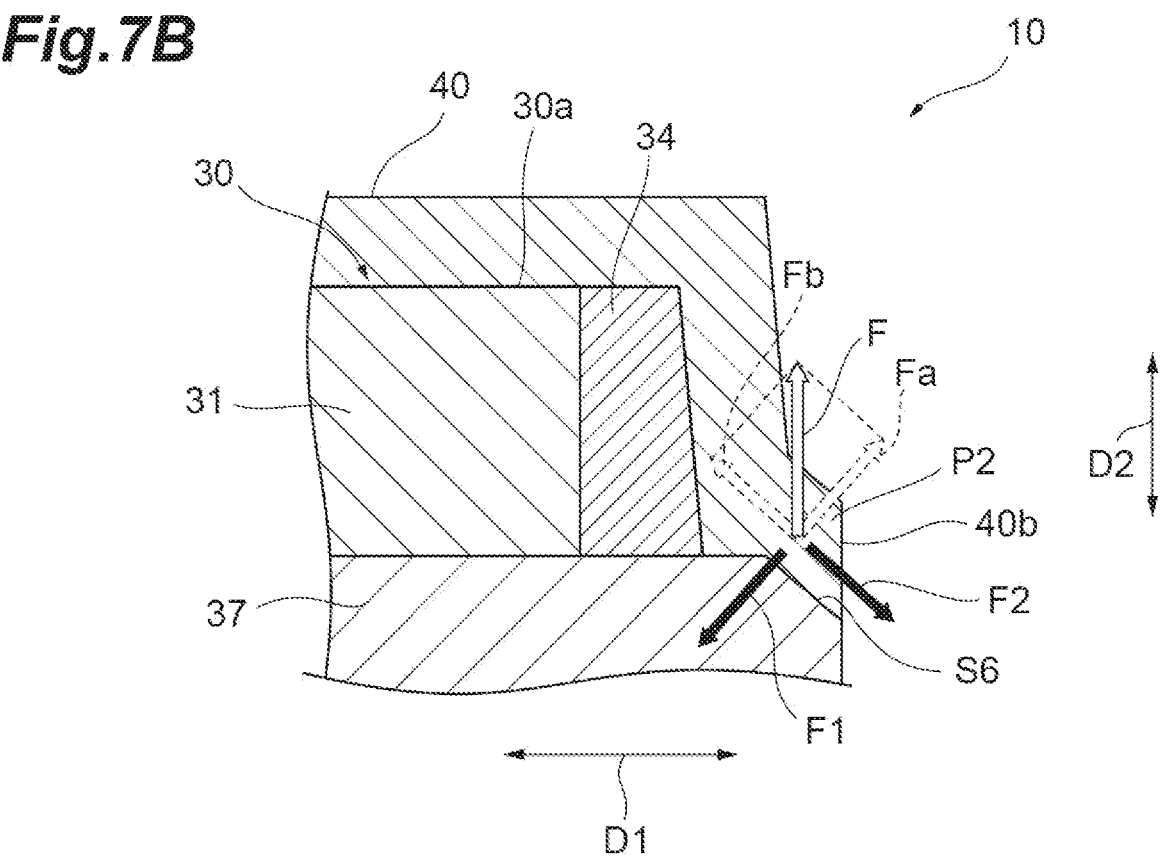
FIG. 7B is an enlarged view illustrating a portion of the rotor of FIG. 3.

However, in the rotor 10 described above, as illustrated in FIGS. 7A and 7B, the bonding surface of the outer circumferential surface 30a of the magnet structure 30 with the one end portion P1 is the tapered surface S2, and the bonding surface of the outer circumferential surface 30a of the magnet structure 30 with the other end portion P2 is the tapered surface S6. FIG. 7A illustrates an enlarged view of the vicinity of the one end portion P1 of FIG. 2. FIG. 7B illustrates an enlarged view of the vicinity of the other end portion P2 of FIG. 3.

As illustrated in FIG. 7A, a bonding force F1 of the one end portion P1 exerted in the normal direction of the tapered surface S2 acts as drag on a normal direction component Fa of the tapered surface S2 of the centrifugal force F exerted on the one end portion P1 during rotation of the rotor 10. Additionally, a force F2 in a shear direction of the one end portion P1 exerted in an in-plane direction of the tapered surface S2 acts as drag on an in-plane direction component Fb of the tapered surface S2 of the centrifugal force F. Similarly, as illustrated in FIG. 7B, the joining force F1 of the other end portion P2 exerted in the normal direction of the tapered surface S6 acts as drag on the normal direction component Fa of the tapered surface S6 of the centrifugal force F exerted on the other end portion P2. Additionally, the force F2 in a shear direction of the other end portion P2 exerted in an in-plane direction of the tapered surface S6 acts as drag on the in-plane direction component Fb of the tapered surface S6 of the centrifugal force F. The bonding force F1 of the one end portion P1 is the bonding force (adhesive force) of the one end portion P1 to the tapered surface S2. The bonding force F1 of the other end portion P2 is the bonding force (adhesive force) of the other end portion P2 to the tapered surface S6.

In this way, at the tapered surfaces S2 and S6, the forces F2 in the shear direction of the one end portion P1 and the other end portion P2 also act as drag on the centrifugal force F in addition to the bonding forces F1 of the one end portion P1 and the other end portion P2. Thus, the one end portion P1 and the other end portion P2 are less likely to peel from the tapered surfaces S2 and S6 during rotation of the rotor 10. That is, the peeling of the protective tube 40 can be suppressed during rotation of the rotor 10. As a result, the loss of balance in rotation of the rotor 10 can be suppressed, and malfunction such as large vibrations of the rotor 10 can be suppressed.

The protective tube 40 is formed using the process of winding the fiber body 40F directly around the outer circumferential surface 30a of the magnet structure 30. Using this process eliminates a production jig for forming the protective tube 40 and a release agent for removing the protective tube 40 from the production jig compared to when a process is employed in which the protective tube 40 is formed in advance using the production jig and is then bonded to the outer circumferential surface 30a of the magnet structure 30. As a result, the production cost and production time for forming the protective tube 40 can be reduced, so that the production efficiency of the rotor 10 can be improved.

The tapered surface S2 is formed on the one end portion 36d of the inner sleeve 36, and the tapered surface S6 is formed on the other end portion 36e of the inner sleeve 36. In such a case in which the tapered surfaces S2 and S6 are formed on an element other than the magnet 31 of the magnet structure 30, the bonding force of the one end portion P1 and the other end portion P2 to the tapered surfaces S2 and S6 can be ensured more reliably compared to a case in which the tapered surfaces S2 and S6 are formed on the magnet 31. Thus, the one end portion P1 and the other end portion P2 are even less likely to peel from the tapered surface S2 and S6 during rotation of the rotor 10.

The tapered surface S2 is formed on the flange portion 38. In this configuration, the distance in the radial direction D2 from the shaft 2, which is the center of rotation, to the tapered surface S2 (radius of gyration) is smaller compared to a case in which the tapered surface S2 is formed on the magnet 31 or the end ring 33. Thus, the centrifugal force F on the one end portion P1 bonded to the tapered surface S2 can be minimized. As a result, the one end portion P1 is even less likely to peel from the tapered surface S2 during rotation of the rotor 10.

The tapered surface S6 is formed on the other end portion 36e of the inner sleeve 36. In this configuration, the distance in the radial direction D2 from the shaft 2, which is the center of rotation, to the tapered surface S6 (that is, the radius of gyration) is smaller compared to a case in which the tapered surface S6 is formed on the magnet 31 or the end ring 34. Thus, the centrifugal force F on the other end portion P2 bonded to the tapered surface S6 can be minimized. As a result, the other end portion P2 is even less likely to peel from the tapered surface S6 during rotation of the rotor 10.

The inclined surface S4 is formed on the one end surface 33b of the end ring 33, and the inclined surface S7 is formed on the other end surface 34c of the end ring 34. When winding the fiber body 40F of the protective tube 40 directly around the outer circumferential surface 30a of the magnet structure 30, it is difficult to wind the fiber body 40F around a flat surface of the magnet structure 30 perpendicular to the axis of rotation L. However, by having the inclined surface S4 formed on the one end surface 33b of the end ring 33, the fiber body 40F can be wound around from the end ring 33 to the flange portion 38 of the inner sleeve 36 without any gaps. Similarly, by having the inclined surface S7 formed on the other end surface 34c of the end ring 34, the fiber body 40F can be wound around from the end ring 34 to the other end portion 36e of the inner sleeve 36 without any gaps.

In the production method of the rotor 10, the magnet structures 30A, 30B, 30C which are arranged in series in the axial direction D1 are collectively wound around with the fiber body 40F when forming the protective tube 40. When the process of winding the fiber body 40F around the magnet structures 30A, 30B, 30C collectively in this manner is employed, the production time for each rotor 10 can be reduced compared to when the process of winding the fiber body 40F around the magnet structures 30A, 30B, 30C individually is employed.

Additionally, an increase in the amount of usage of the fiber body 40F to be wound around each magnet structure 30 can be suppressed. This method can thus improve the production efficiency of the rotor 10.

<Variations>

It is to be understood that not all aspects, advantages and features described herein may necessarily be achieved by, or included in, any one particular example. Indeed, having described and illustrated various examples herein, it should be apparent that other examples may be modified in arrangement and detail.

Figure 8:
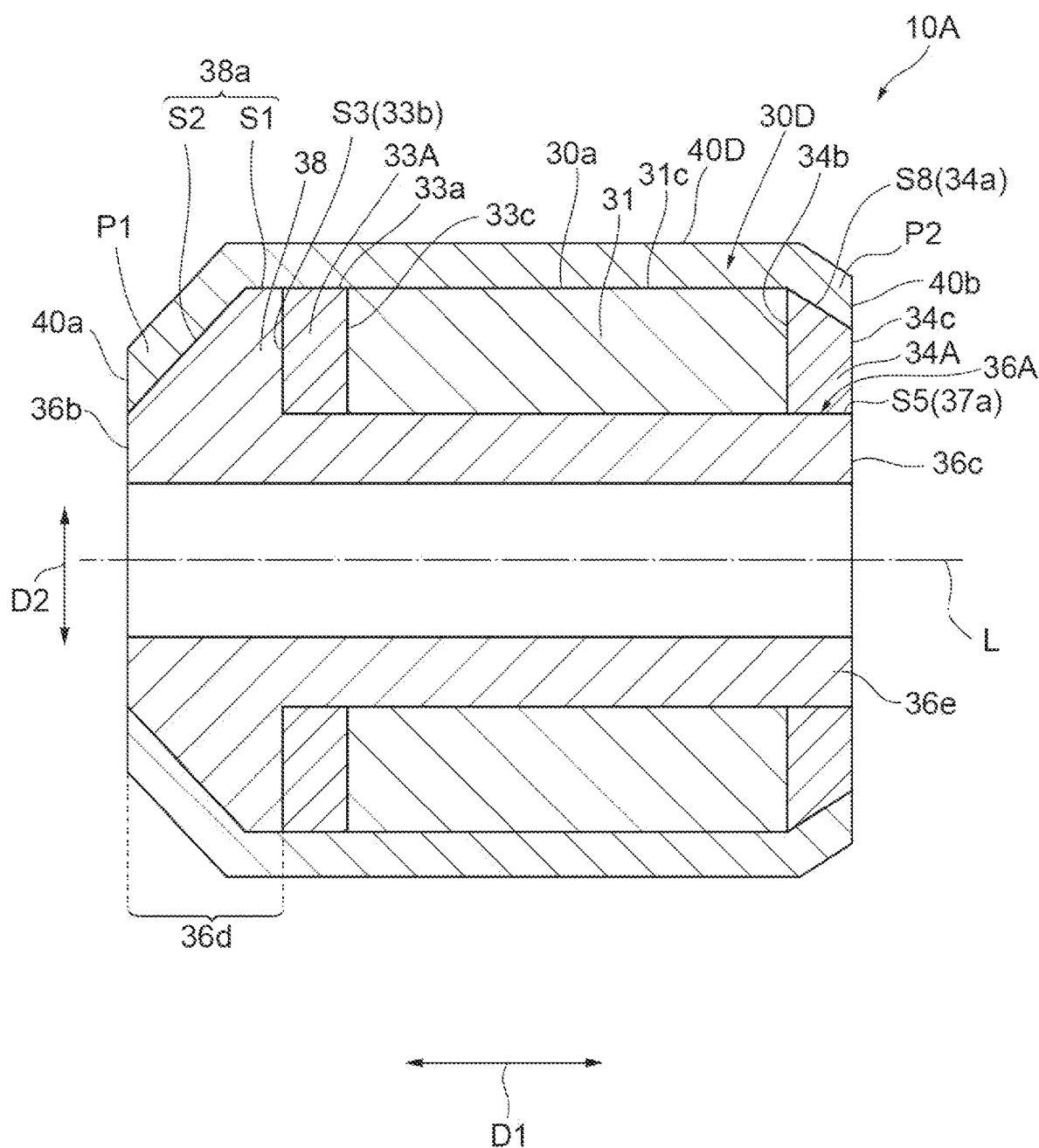
FIG. 8 is a cross-sectional view illustrating another example rotor.

FIG. 8 is a cross-sectional view illustrating another example rotor 10A. In the example rotor 10 described above, the tapered surface S6 is formed on the outer circumferential surface 37a of the other end portion 36e of the inner sleeve 36. The rotor 10A illustrated in FIG. 8 has no tapered surface formed on the outer circumferential surface 37a of the other end portion 36e of an inner sleeve 36A, but has a tapered surface S8 formed on the outer circumferential surface 34a of an end ring 34A. As illustrated in FIG. 8, the entire outer circumferential surface 37a of the other end portion 36e of the cylindrical body portion 37 is the circumferential surface S5. The tapered surface S8 is formed on the entire outer circumferential surface 34a of the end ring 34A. In the example illustrated in FIG. 8, the other end portion 36e of the inner sleeve 36A does not project to a position outward of the end ring 34A in the axial direction D1 (that is, on a side of the end ring 34A opposite the magnet 31), but lies within the end ring 34A. In one example, the other end surface 34c of the end ring 34A is in the same position as the other end surface 36c of the inner sleeve 36A in the axial direction D1. The other end surface 34c of the end ring 34A may be flush with the other end surface 36c of the inner sleeve 36A.

The tapered surface S8 gradually decreases in diameter as it gets closer to the other end surface 34c from the one end surface 34*b* in the axial direction D1 (that is, away from the one end portion P1 of a protective tube 40D in the axial direction D1). The tapered surface S8 is tapered inward in the radial direction D2 as it gets closers to the other end surface 34*c* from the one end surface 34*b* in the axial direction D1. As a result, the tapered surface S8 is inclined with respect to the axial direction D1, and a normal direction of the tapered surface S8 is inclined with respect to the radial direction D2. The angle of the normal direction of the tapered surface S8 with respect to the radial direction D2 may be the same as the angle of the normal direction of the tapered surface S2 (see FIG. 2) with respect to the radial direction D2, or may be different from the angle of the normal direction of the tapered surface S2 with respect to the radial direction D2.

The other end portion P2 of the protective tube 40D is positioned on the tapered surface S8 of the end ring 34A, and is bonded to the tapered surface S8. In one example, the other end surface 40*b* of the protective tube 40D is in the same position as the other end surface 34*c* of the end ring 34A in the axial direction D1. In this case, the other end surface 40*b* of the protective tube 40D is flush with the other end surface 34*c* of the end ring 34A. The one end portion P1 of the protective tube 40D is bonded to the tapered surface S2 of the flange portion 38 of the inner sleeve 36A similarly to the example described above.

In the rotor 10A, the outer diameter of the circumferential surface S1 of the flange portion 38 is the same as the outer diameter of the outer circumferential surface 33*a* of an end ring 33A. That is, the circumferential surface S1 of the flange portion 38 is in the same position as the outer circumferential surface 33*a* of the end ring 33A in the radial direction D2. There is thus no step between the circumferential surface S1 and the outer circumferential surface 33*a*, and the circumferential surface S1 and the outer circumferential surface 33*a* are continuously connected to each other. Namely, the circumferential surface S1 of the flange portion 38 and the end ring 33 have a same diameter. In addition, the circumferential surface S1 of the flange portion 38 and the magnet 31 have a same diameter. Accordingly, the circumferential surface S1 of the flange portion 38, the outer circumferential surface 33*a* of the end ring 33, and the outer circumferential surface 31*c* of the magnet 31 extend continuously. In this case, since a perpendicular surface is not formed between the circumferential surface S1 and the outer circumferential surface 33*a*, the fiber body 40F can be wound around continuously without gaps from the circumferential surface S1 to the outer circumferential surface 33*a* when forming the protective tube 40D using the filament winding process. Thus, unlike the example described above, an inclined surface for continuously winding the fiber body 40F around may not be formed on the one end surface 33*b* of the end ring 33A in the rotor 10A.

When forming the protective tube 40D using the process of winding the fiber body 40F individually around a magnet structure 30D, the protective tube 40D illustrated in FIG. 8 can be formed by winding the fiber body 40F around the outer circumferential surface 30*a* of the magnet structure 30D in a section from the one end surface 36*b* of the inner sleeve 36A to the other end surface 34*c* of the end ring 34A. When forming the protective tube 40D using the process of winding the fiber body 40F around a plurality of the magnet structures 30D arranged in series collectively, the protective tube 40D illustrated in FIG. 8 can be formed by continuously winding the fiber body 40F around the outer circumferential surfaces 30*a* of the magnet structures 30D in a section from the one end surface 36*b* of the inner sleeve 36A of the magnet structure 30D positioned at one end in the axial direction D1 to the other end surface 34*c* of the end ring 34A of the magnet structure 30D positioned at the other end in the axial direction D1, similarly to the example described above.

In the rotor 10A, the one end portion P1 and the other end portion P2 of the protective tube 40D are respectively bonded to the tapered surfaces S2 and S8, so that effects similar to those of the example described above can be obtained. Additionally, in the rotor 10A, the other end portion P2 of the protective tube 40D is positioned on the tapered surface S8 of the end ring 34A, so that when winding the fiber body 40F around the outer circumferential surface 30*a* of the magnet structure 30D, winding the fiber body 40F around from the end ring 34A to the other end portion 36*e* of the inner sleeve 36A can be avoided. If the fiber body 40F were to be wound around from the end ring 34A to the other end portion 36*e* of the inner sleeve 36A, it would be difficult to wind the fiber body 40F around the other end surface 34*c* of the end ring 34A since the other end surface 34*c* is a plane perpendicular to the axial direction D1. However, in the rotor 10A, the section in which the fiber body 40F is wound around is from the one end surface 36*b* of the inner sleeve 36A to the other end surface 34*c* of the end ring 34A. Since, in this section, the fiber body 40F is not wound around a plane perpendicular to the axial direction D1, the fiber body 40F can be continuously wound around the outer circumferential surface 30*a* of the magnet structure 30D without gaps in this section. As a result, the protective tube 40D that covers the outer circumferential surface 30*a* of the magnet structure 30D can be formed.

In the example rotor 10 described above, the tapered surfaces S2 and S6 to which the one end portion P1 and the other end portion P2 of the protective tube 40 are respectively bonded are formed on an element other than the magnet 31 of the magnet structure 30. However, at least one of the tapered surfaces S2 and S6 may be formed on the magnet 31. For example, the tapered surfaces S2 and S6 may be formed on respective end portions of the outer circumferential surface 31*c* of the magnet 31 in the axial direction D1, or the tapered surface S2 or S6 may be formed on one end portion or the other end portion of the outer circumferential surface 31*c* of the magnet 31 in the axial direction D1.

In the example rotor 10 described above, the tapered surface S2 to which the one end portion P1 of the protective tube 40 is bonded is formed on the outer circumferential surface 38*a* of the flange portion 38 of the inner sleeve 36. However, the tapered surface S2 to which the one end portion P1 of the protective tube 40 is bonded is not limited to being formed on the inner sleeve 36, and may be formed on the outer circumferential surface 33*a* of the end ring 33. The magnet structure 30 may not have the inner sleeve 36, and the magnet 31 may be attached directly to the shaft 2. In this case, the end rings 33, 34 may be formed integral with the shaft 2. The tapered surface S2 may be formed on the outer circumferential surface 33*a* of the end ring 33. The tapered surface S6 may be formed on the outer circumferential surface 34*a* of the end ring 34.

The invention claimed is:

1. A rotor comprising:
 a cylindrical magnet structure extending in an axial direction to cover a shaft, wherein the magnet structure has an outer circumferential surface including a first circumferential surface having a first diameter that is constant along the axial direction, a first tapered surface gradually decreasing in diameter from the first circumferential surface toward a first end surface of the magnet structure, a second circumferential surface having a second diameter that is constant along the axial direction, and a second tapered surface gradually decreasing in diameter from the second circumferential surface toward a second end surface opposite the first end surface in the axial direction, wherein the first diameter of the first circumferential surface from which the first tapered surface extends, is greater than the second diameter of the second circumferential surface from which the second tapered surface extends; and a protective tube including a fiber body covering the outer circumferential surface of the magnet structure, wherein the protective tube includes a first end portion that is bonded to the first tapered surface of the magnet structure, and a second end portion that is bonded to the second tapered surface of the magnet structure.

2. The rotor according to claim 1, wherein the first tapered surface and the second tapered surface encircle the outer circumferential surface of the magnet structure.

3. The rotor according to claim 1, wherein outer circumferential surfaces of the first end portion and the second end portion of the protective tube are exposed to form an outer surface of the rotor.

4. The rotor according to claim 1,
wherein the first tapered surface of the magnet structure extends away from the first end surface at an angle with respect to the axial direction, that is greater than 45 degrees and less than 90 degrees, and
wherein the second tapered surface extends away from the second end surface at an angle with respect to the axial direction, that is greater than 45 degrees and less than 90 degrees.

5. The rotor according to claim 1,
wherein the first tapered surface of the magnet structure extends away from the first end surface at a first angle with respect to the axial direction, and
wherein the second tapered surface extends away from the second end surface at a second angle with respect to the axial direction, that is different from the first angle.

6. The rotor according to claim 1, wherein a length of the protective tube in the axial direction equals a length of the magnet structure in the axial direction.

7. The rotor according to claim 1,
wherein the magnet structure includes a magnet and an inner sleeve extending inside the magnet,
wherein a longitudinal end portion of the inner sleeve extends outside the magnet in the axial direction, and
wherein the first tapered surface is formed on the longitudinal end portion of the inner sleeve.

8. The rotor according to claim 7,
wherein the longitudinal end portion of the inner sleeve has a flange protruding outwardly in a radial direction of the magnet structure,
wherein the flange is entirely positioned inward of an outer circumferential surface of the magnet, in the radial direction, and
wherein the first tapered surface is formed on the flange.

9. The rotor according to claim 8,
wherein the longitudinal end portion of the inner sleeve forms a first end portion,
wherein the inner sleeve includes a second end portion opposite the first end portion in the axial direction, that extends outside the magnet,
wherein the second end portion is positioned inward of the magnet in the radial direction, and
wherein the second tapered surface is formed on the second end portion of the inner sleeve.

10. The rotor according to claim 8,
wherein the longitudinal end portion of the inner sleeve forms a first end portion,
wherein the inner sleeve includes a second end portion opposite the first end portion in the axial direction,
wherein the magnet structure further includes a first end ring and a second end ring disposed on opposite sides of the magnet in the axial direction,
wherein the second end ring is positioned adjacent the second end portion of the inner sleeve in the axial direction, and
wherein the second tapered surface is formed on the second end ring.

11. An electric motor comprising:
the rotor according to claim 1, and
a stator disposed around the rotor.

12. The rotor according to claim 1, wherein the outer circumferential surface of the magnet structure includes an inclined surface that extends from the first circumferential surface, away from the first tapered surface in the axial direction and outwardly in a radial direction of the magnet structure.

13. A rotor comprising:
a cylindrical magnet structure extending in an axial direction to cover a shaft, wherein the magnet structure includes:
an outer circumferential surface including a first tapered surface decreasing in diameter toward a first end surface of the magnet structure, and a second tapered surface gradually decreasing in diameter toward a second end surface opposite the first end surface in the axial direction;
a magnet; and
an inner sleeve extending inside the magnet in the axial direction from a first end portion to a second end portion; and
a protective tube including a fiber body covering the outer circumferential surface of the magnet structure,
wherein the first end portion of the inner sleeve has a flange that protrudes outwardly in a radial direction of the magnet structure, and that forms the first tapered surface,
wherein the second end portion of the inner sleeve is positioned inward of the magnet in the radial direction, and forms the second tapered surface, and
wherein the protective tube includes a first end portion that is bonded to the first tapered surface of the magnet structure, and a second end portion that is bonded to the second tapered surface of the magnet structure.

14. The rotor according to claim 13,
wherein the magnet structure further includes a first end ring and a second end ring respectively disposed on opposite sides of the magnet in the axial direction,
wherein the first end ring is located between the magnet and the flange in the axial direction, and has an end surface opposite to the magnet in the axial direction, and
wherein the end surface of the first end ring has an inclined surface that is positioned outward of the flange in the radial direction and that is inclined to extend toward the magnet in the axial direction and outwardly in the radial direction.

15. The rotor according to claim 14,
wherein the second end ring is positioned adjacent to the second end portion of the inner sleeve, and has an end surface opposite to the magnet in the axial direction, wherein the end surface of the second end ring is inclined to extend toward the magnet in the axial direction and outwardly in the radial direction, wherein the second end portion of the inner sleeve extends outwardly in the axial direction from the end surface of the second end ring, and wherein the end surface of the second end ring is positioned outward in the radial direction, of the second tapered surface of the second end portion of the inner sleeve.

16. The rotor according to claim 13, wherein an outer circumferential surface of the magnet is positioned outward of the flange, in the radial direction.

17. The rotor according to claim 16, wherein the first end portion and the second end portion of the inner sleeve extends outside the magnet in the axial direction.

18. A rotor comprising:
a cylindrical magnet structure extending in an axial direction to cover a shaft, wherein the magnet structure includes:
an outer circumferential surface including a first tapered surface decreasing in diameter toward a first end surface of the magnet structure, and a second tapered surface gradually decreasing in diameter toward a second end surface opposite the first end surface in the axial direction;
a magnet;
an inner sleeve extending inside the magnet in the axial direction from a first end portion to a second end portion; and
a first end ring and a second end ring disposed on opposite sides of the magnet in the axial direction; and
a protective tube including a fiber body covering the outer circumferential surface of the magnet structure, wherein the second end ring is positioned adjacent the second end portion of the inner sleeve in the axial direction, wherein the second tapered surface is formed on the second end ring, and wherein the protective tube includes a first end portion that is bonded to the first tapered surface of the magnet structure, and a second end portion that is bonded to the second tapered surface of the magnet structure.

19. The rotor according to claim 18,
wherein the first end ring is located between the magnet and the flange in the axial direction,
wherein the flange has a circumferential surface that extends along the axial direction between the first tapered surface and the first end ring,
wherein a diameter of the circumferential surface, a diameter of the first end ring and a diameter of the magnet are equal to each other, and
wherein the circumferential surface of the flange, an outer circumferential surface of the first end ring, and an outer circumferential surface of the magnet are located contiguously to each other.

20. The rotor according to claim 18,
wherein the first end portion of the inner sleeve extends outside the magnet in the axial direction,
wherein the first end portion of the inner sleeve has a flange protruding outwardly in a radial direction of the magnet structure,
wherein the flange is entirely positioned inward of an outer circumferential surface of the magnet, in the radial direction, and
wherein the first tapered surface is formed on the flange.

* * * * *